(12) United States Patent
Kusashima et al.

(10) Patent No.: US 12,009,908 B2
(45) Date of Patent: *Jun. 11, 2024

(54) TERMINAL DEVICE, BASE STATION DEVICE, AND METHOD

(71) Applicant: SONY GROUP CORPORATION, Tokyo (JP)

(72) Inventors: Naoki Kusashima, Kanagawa (JP); Kazuyuki Shimezawa, Kanagawa (JP); Hiromasa Uchiyama, Tokyo (JP); Hiroki Matsuda, Tokyo (JP); Ryota Kimura, Tokyo (JP); Yifu Tang, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,499

(22) Filed: Jul. 14, 2023

(65) Prior Publication Data
US 2023/0361865 A1 Nov. 9, 2023

Related U.S. Application Data

(63) Continuation of application No. 17/844,179, filed on Jun. 20, 2022, now Pat. No. 11,742,937, which is a (Continued)

(30) Foreign Application Priority Data

Nov. 16, 2017 (JP) ................................ 2017-221278

(51) Int. Cl.
*H04B 7/185* (2006.01)
*H04W 56/00* (2009.01)
*H04W 84/06* (2009.01)

(52) U.S. Cl.
CPC ...... *H04B 7/18589* (2013.01); *H04B 7/18513* (2013.01); *H04W 56/0045* (2013.01); *H04W 56/005* (2013.01); *H04W 84/06* (2013.01)

(58) Field of Classification Search
CPC ............ H04B 7/18589; H04B 7/18513; H04B 7/185; H04B 7/18504; H04B 7/2125;
(Continued)

(56) References Cited

U.S. PATENT DOCUMENTS

| 10,547,374 B1 | 1/2020 | Liu |
| 2006/0281476 A1 | 12/2006 | Lane et al. |

(Continued)

FOREIGN PATENT DOCUMENTS

| CN | 101243623 A | 8/2008 |
| EP | 2048795 A2 | 4/2009 |

(Continued)

OTHER PUBLICATIONS

"Study on New Radio (NR) to support non-terrestrial networks", 3rd Generation Partnership Project; Technical Specification Group Radio Access Network; Technical Report, Release 15, 3GPP TR 38.811, Version 15.0.0, Jun. 2018, 118 pages.

(Continued)

*Primary Examiner* — Ashley Shivers
(74) *Attorney, Agent, or Firm* — CHIP LAW GROUP

(57) ABSTRACT

Provided is a mechanism which is capable of improving wireless link quality regarding transmission from a terminal device on the ground to a non-ground station device. A terminal device including a control unit configured to acquire information regarding a type of a base station device and control a transmission timing of a signal to the base station device on the basis of the information regarding the type of the base station device.

12 Claims, 23 Drawing Sheets

Related U.S. Application Data continuation of application No. 16/762,264, filed as application No. PCT/JP2018/038328 on Oct. 15, 2018, now Pat. No. 11,394,459.

(58) Field of Classification Search
CPC .......... H04W 56/0045; H04W 56/005; H04W 84/06; H04W 88/08; H04W 48/16; H04W 56/00; H04W 56/0005
See application file for complete search history.

(56) References Cited

U.S. PATENT DOCUMENTS

| | | |
|---|---|---|
| 2007/0123252 A1 | 5/2007 | Tronc et al. |
| 2012/0263108 A1 | 10/2012 | Ban et al. |
| 2015/0173038 A1 | 6/2015 | Quan et al. |
| 2016/0173188 A1 | 6/2016 | Uchino et al. |
| 2018/0241464 A1 | 8/2018 | Michaels |
| 2019/0045474 A1 | 2/2019 | Li et al. |
| 2021/0175964 A1 | 6/2021 | Kusashima et al. |

FOREIGN PATENT DOCUMENTS

| | | |
|---|---|---|
| JP | 2008-544647 A | 12/2008 |
| JP | 2011-193494 A | 9/2011 |
| JP | 2015-204593 A | 11/2015 |
| KR | 10-2008-0033941 A | 4/2008 |
| WO | 2006/138197 A2 | 12/2006 |

OTHER PUBLICATIONS

"Study on NR to support Non-Terrestrial Networks", 3rd Generation Partnership Project; Technical Specification Group Radio Access Network, 75 Meeting, RP-170717, Dubrovnik, Croatia, Mar. 6-9, 2017, 5 pages.

International Search Report and Written Opinion of PCT Application No. PCT/JP2018/038328, dated Nov. 20, 2018, 08 pages of English Translation and 07 pages of ISRWO.

International Preliminary Report on Patentability of PCT Application No. PCT/JP2018/038328, dated May 28, 2020, 08 pages of English Translation and 04 pages of IPRP.

Non-Final Office Action for U.S. Appl. No. 16/762,264, dated Oct. 28, 2021,16 pages.

Notice of Allowance for U.S. Appl. No. 16/762,264, dated Mar. 18, 2022, 10 pages.

"Study on New Radio (NR) to support non terrestrial networks", 3rd Generation Partnership Project, Technical Specification Group Radio Access Network, Release 15, 3GPP TR 38.811, V15.0.0, Aug. 10, 2018.

Notice of Allowance for U.S. Appl. No. 17/844,179, dated Apr. 10, 2023, 10 pages.

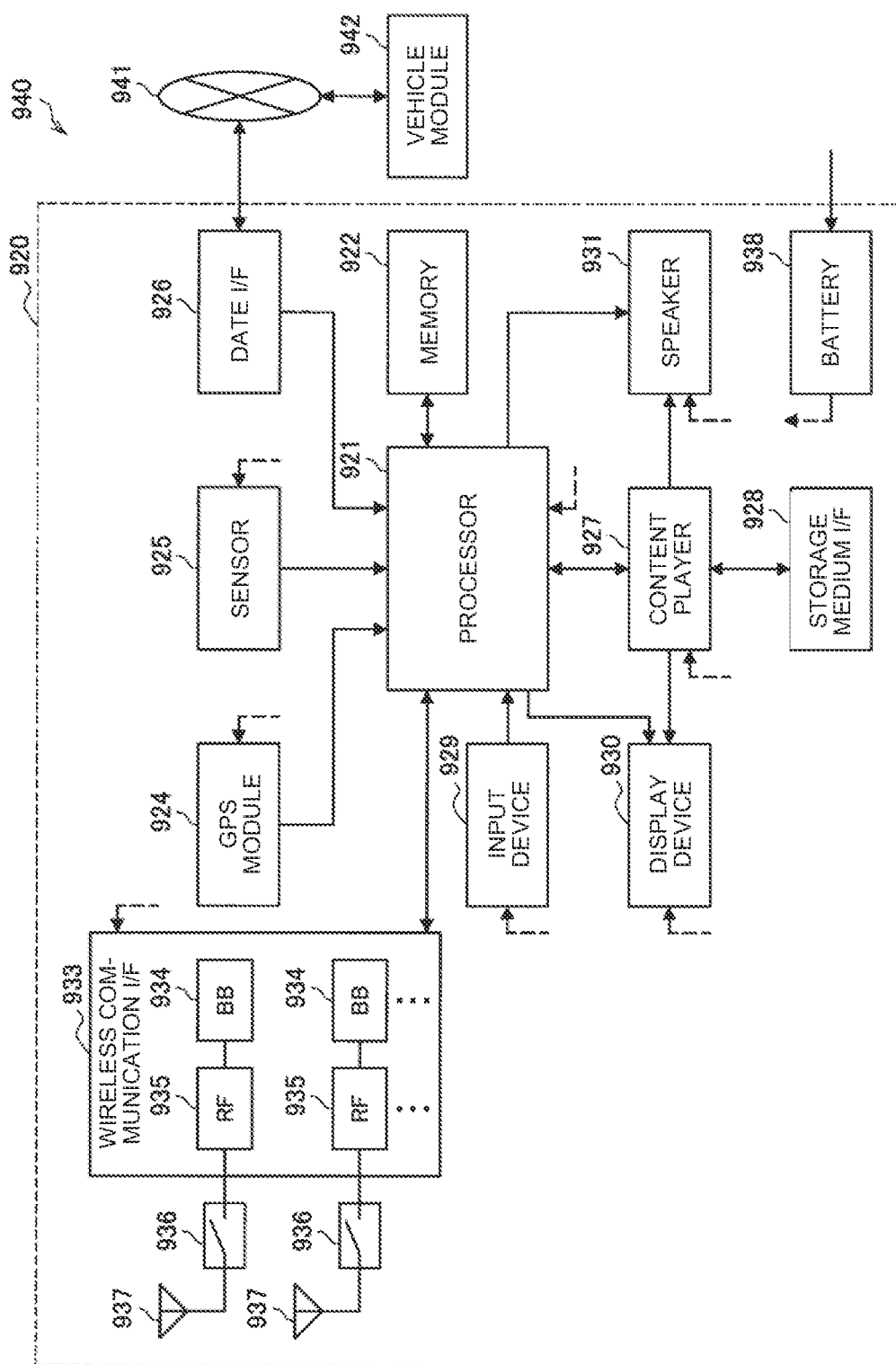

TERMINAL DEVICE, BASE STATION DEVICE, AND METHOD

CROSS REFERENCE TO RELATED APPLICATIONS

This application is a continuation application of U.S. patent application Ser. No. 17/844,179, filed Jun. 20, 2022, now U.S. Pat. No. 11,742,937, which is a continuation application of U.S. patent application Ser. No. 16/762,264, filed May 7, 2020, now U.S. Pat. No. 11,394,459, which is a U.S. National Phase of International Patent Application No. PCT/JP2018/038328 filed on Oct. 15, 2018, which claims the benefit of priority from Japanese Patent Application No. JP 2017-221278 filed in the Japan Patent Office on Nov. 16, 2017. Each of the above-referenced applications is hereby incorporated herein by reference in its entirety.

FIELD

The present disclosure relates to a terminal device, a base station device, and a method.

BACKGROUND

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), 5G, Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE, a base station device (base station) is also referred to as an evolved Node B (eNodeB), in NR, the base station device (base station) is also referred to as gNodeB, and in LTE and NR, a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases.

Further, in NR, study of a non-terrestrial network in which a wireless network is provided from a device floating in the air or in space has been started in response to growing demand for a wide-area coverage and connection stability. In the non-terrestrial network, a wireless network is provided to a terminal device on the ground (earth terminal device which will be described later) via a non-ground station device such as a satellite station device and an aircraft. Further, in the non-terrestrial network, by using a wireless access scheme which is the same as that for a terrestrial network, it is possible to facilitate operation of the terrestrial network and the non-terrestrial network in an integrated manner. Outline of the non-terrestrial network is disclosed in Non Patent Literature 1.

CITATION LIST

Patent Literature

Non Patent Literature 1: PR-170717, Thales, Dish network, et al, "Study on NR to support Non-Terrestrial Networks", 3GPP TSG RAN Meeting #75, Dubrovnik, Croatia, March, 2017.

SUMMARY

Technical Problem

A propagation delay in communication performed between a non-ground station device and a terminal device on the ground is larger than that in communication performed between a base station device provided on the ground and the terminal device on the ground. However, a synchronization technology regarding transmission from the terminal device on the ground to the non-ground station device in such a communication environment where a propagation delay is large has not been studied so far. As a result, it cannot be said that wireless link quality regarding transmission from the terminal device on the ground to the non-ground station device is sufficient.

Therefore, the present disclosure proposes a mechanism which is capable of improving wireless link quality regarding transmission from a terminal device on the ground to a non-ground station device.

Solution to Problem

According to the present disclosure, a terminal device is provided that includes: a control unit configured to acquire information regarding a type of a base station device and control a transmission timing of a signal to the base station device on a basis of the information regarding the type of the base station device.

Moreover, according to the present disclosure, a base station device which performs communication with a terminal device is provided that includes: a control unit configured to transmit information regarding a type of the base station device to the terminal device.

Moreover, according to the present disclosure, a method to be executed by a processor is provided that includes: acquiring information regarding a type of a base station device and controlling a transmission timing of a signal to the base station device on a basis of the information regarding the type of the base station device.

Advantageous Effects of Invention

According to the present disclosure as described above, a mechanism which is capable of improving wireless link quality regarding transmission from a terminal device on the ground to a non-ground station device is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 26 is a block diagram illustrating an example of a schematic configuration of a car navigation apparatus.

DESCRIPTION OF EMBODIMENTS

Figure 1:
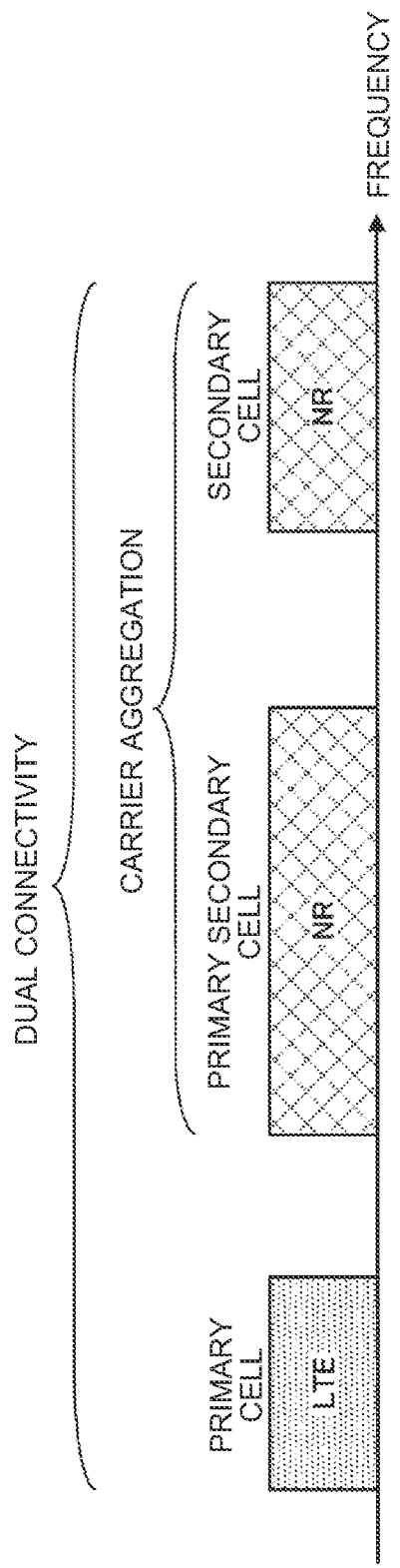
FIG. 1 is a diagram illustrating an example of setting of a component carrier according to a present embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted. In addition, technologies, functions, methods, configurations, and procedures to be described below and all other descriptions can be applied to LTE and NR unless particularly stated otherwise.

Further, in the following description, in a case where a term specific to NR is particularly referred to, there is a case where "NR-" is added at the beginning of the term. For example, a physical random access channel (PRACH) which is specific to NR can be expressed as an NR-PRACH. Meanwhile, a term to which "NR-" is not added at the beginning may be regarded as a term specific to NR or may be regarded as a term which is not specific to NR (for example, a term of LTE). For example, a "PRACH" may be regarded as an NR-PRACH or may be regarded as a PRACH of LTE.

Note that description will be provided in the following order.

1. Introduction
2. Technical problems
3. Functional configuration examples
4. Technical features
5. Modified examples
6. Application examples
7. Conclusion

1. INTRODUCTION

<Wireless Communication System in the Present Embodiment>

In the present embodiment, a wireless communication system includes at least a base station device 100 and a terminal device 200. The base station device 100 can accommodate multiple terminal devices 200. The base station device 100 can be connected with another base station device 100 by means of an X2 interface. Further, the base station device 100 can be connected to an evolved packet core (EPC) by means of an S1 interface. Further, the base station device 100 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 100. Further, in the present embodiment, the base station device 100 and the terminal device 200 each support LTE and/or NR.

<Wireless Access Technology According to Present Embodiment>

In the present embodiment, the base station device 100 and the terminal device 200 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 100 to the terminal device 200. Downlink transmission is transmission from the base station device 100 to the terminal device 200 and is transmission of a downlink physical channel and/or a downlink physical signal. Uplink communication is communication from the terminal device 200 to the base station device 100. Hereinafter, a downlink physical channel and a downlink physical signal to be downlink transmitted will be also collectively referred to as a downlink signal. Uplink transmission is transmission from the terminal device 200 to the base station device 100 and is transmission of an uplink physical channel and/or an uplink physical signal. Hereinafter, an uplink physical channel and an uplink physical signal to be uplink transmitted will be also collectively referred to as an uplink signal. Sidelink communication is communication from the terminal device 200 to another terminal device 200. Sidelink transmission is transmission from the terminal device 200 to another terminal device 200 and is transmission of a sidelink physical channel and/or a sidelink physical signal. Hereinafter, a sidelink physical channel and a sidelink physical signal to be sidelink transmitted will be also collectively referred to as a sidelink signal.

The sidelink communication is defined for contiguous direct detection and contiguous direct communication between terminal devices 200. The sidelink communication, a frame configuration similar to that of the uplink and downlink can be used. Further, the sidelink communication can be restricted to some (sub sets) of uplink resources and/or downlink resources.

The base station device 100 and the terminal device 200 can support communication in which a set of one or more cells is used in a downlink, an uplink, and/or a sidelink. A set of a plurality of cells or communication by a set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
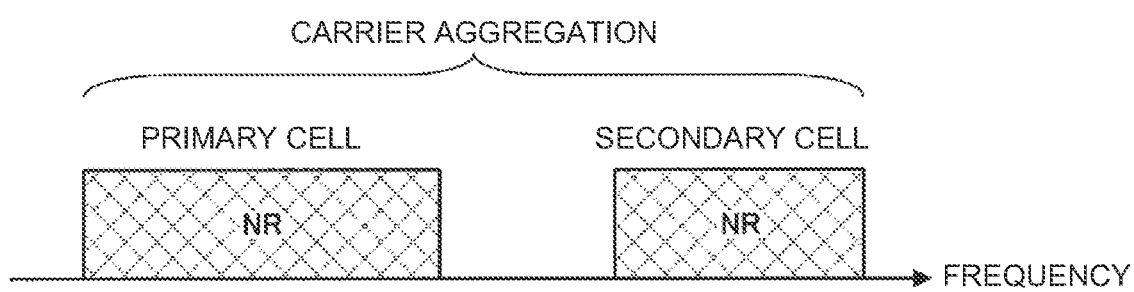
FIG. 2 is a diagram illustrating an example of setting of a component carrier according to a present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using one or more predetermined parameters in a predetermined time length. In other words, in the terminal device 200, it is assumed that a downlink signal to be transmitted from the base station device 100 and an uplink signal to be transmitted to the base station device 100 are each generated with one or more predetermined parameters in a predetermined time length. Further, the base station device 100 is set such that a downlink signal to be transmitted to the terminal device 200 and an uplink signal to be transmitted from the terminal device 200 are each generated with a predetermined time length using one or more predetermined parameters. In a case in which the plurality of predetermined parameters is used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

Figure 3:
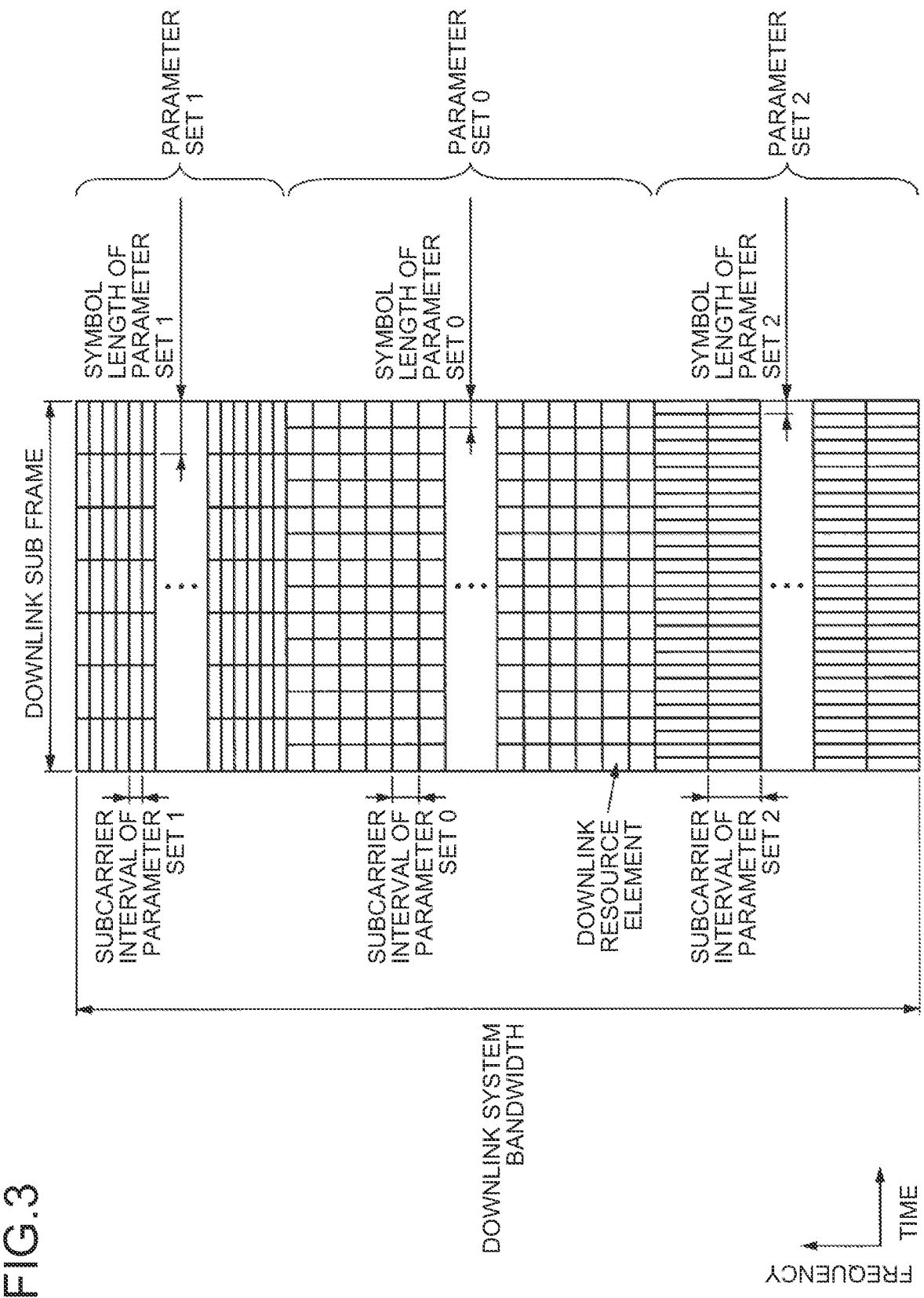
FIG. 3 is a diagram illustrating an example of an NR downlink sub frame of the present embodiment.

FIG. 3 is a diagram illustrating an example of an NR downlink sub frame of the present embodiment. In the example of FIG. 3, signals generated using parameter set 1, parameter set 0, and parameter set 2 are subjected to FDM in a cell (system bandwidth). The diagram illustrated in FIG. 3 is also referred to as a downlink resource grid of NR. The base station device 100 can transmit the downlink physical channel of NR and/or the downlink physical signal of NR in a downlink sub frame to the terminal device 200. The terminal device 200 can receive a downlink physical channel of NR and/or the downlink physical signal of NR in a downlink sub frame from the base station device 100.

Figure 4:
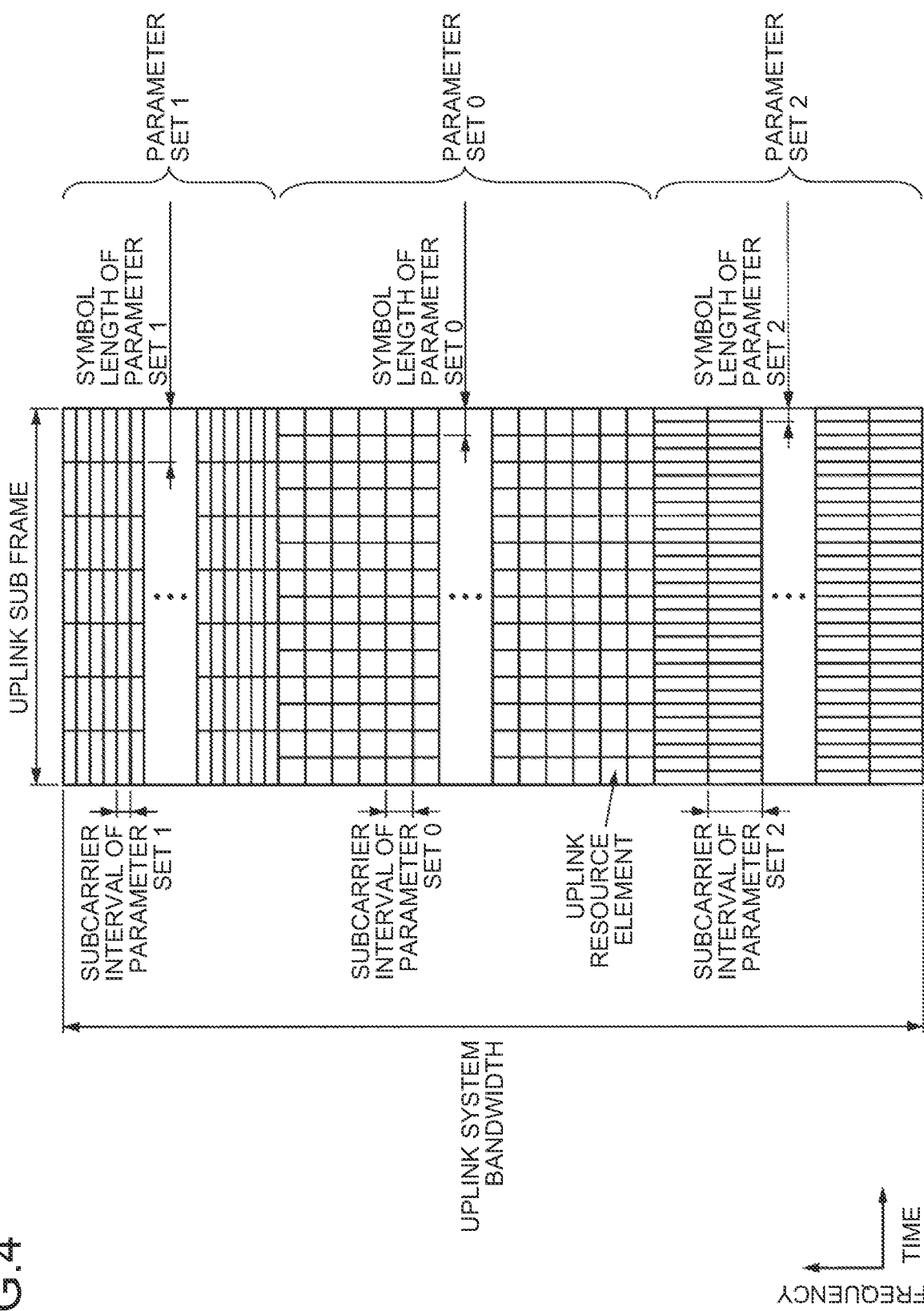
FIG. 4 is a diagram illustrating an example of an NR uplink sub frame of the present embodiment.

FIG. 4 is a diagram illustrating an example of an NR uplink sub frame of the present embodiment. In the example of FIG. 4, signals generated using parameter set 1, parameter set 0, and parameter set 2 are subjected to FDM in a cell (system bandwidth). The diagram illustrated in FIG. 4 is also referred to as an uplink resource grid of NR. The base station device 100 can transmit the uplink physical channel of NR and/or the uplink physical signal of NR in an uplink sub frame to the terminal device 200. The terminal device 200 can receive an uplink physical channel of NR and/or the uplink physical signal of NR in an uplink sub frame from the base station device 100.

In the present embodiment, the physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of OFDM symbols or SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

<Configuration Example of Base Station Device in Present Embodiment>

Figure 5:
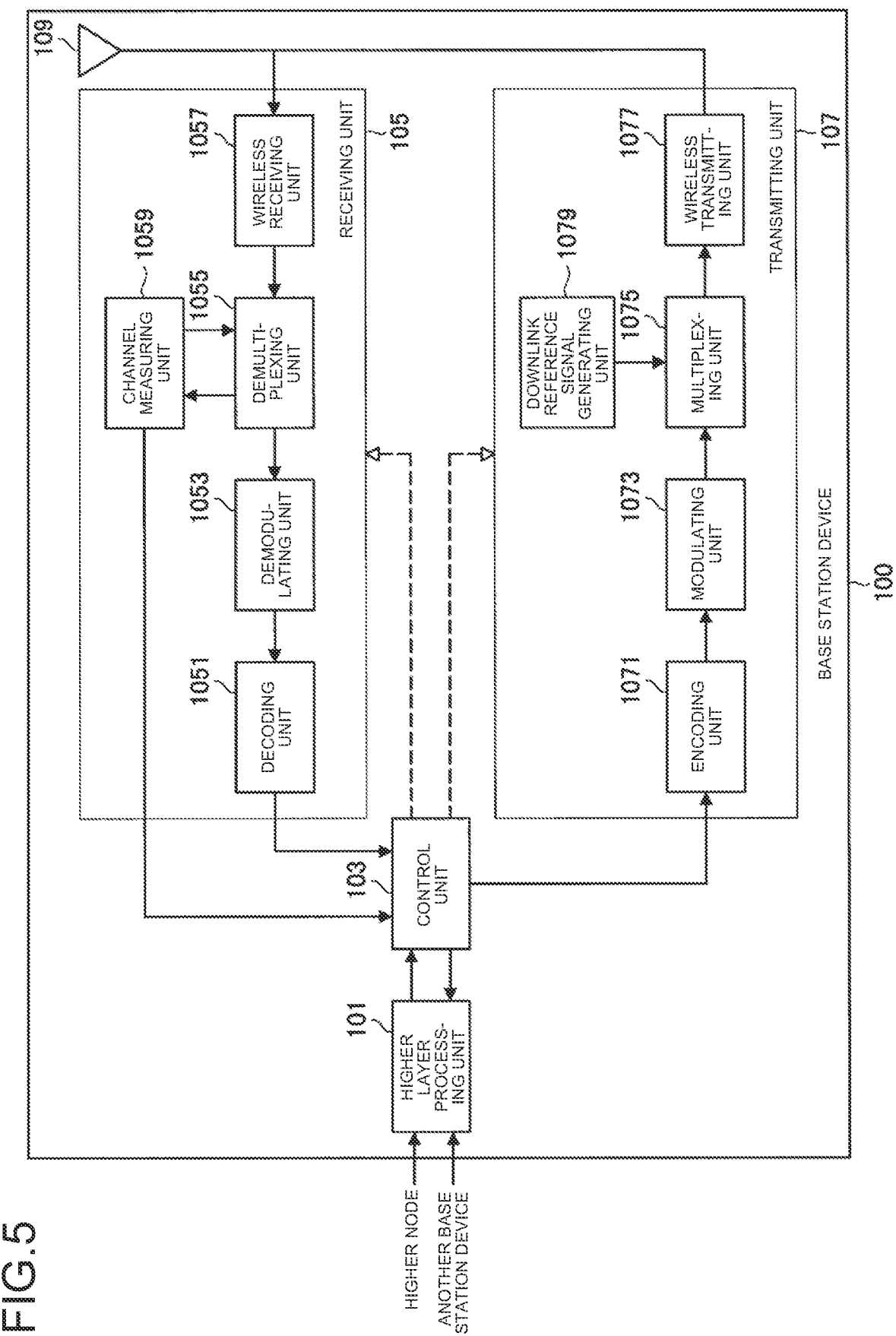
FIG. 5 is a schematic block diagram illustrating a configuration of a base station device of the present embodiment.

FIG. 5 is a schematic block diagram illustrating a configuration of the base station device 100 of the present embodiment. As illustrated, the base station device 100 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 100 can support one or more RATs. Some or all of the units included in the base station device 100 illustrated in FIG. 5 can be configured individually in accordance with the RAT. For example, the receiving unit 105 and the transmitting unit 107 are configured individually in LTE and NR. Further, in the NR cell, some or all of the units included in the base station device 100 illustrated in FIG. 5 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 100.

The higher layer processing unit 101 performs a process and management related to RAT control, radio resource control, sub frame setting, scheduling control, and/or CSI report control. The process and the management in the higher layer processing unit 101 are performed for each terminal device 200 or in common to terminal devices 200 connected to the base station device 100. The process and the management in the higher layer processing unit 101 may be performed only by the higher layer processing unit 101 or may be acquired from a higher node or another base station device 100. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 200 is controlled. For example, a setting related to the CSI reference resources assumed to calculate the CSI in the terminal device 200 is controlled.

Under the control from the control unit 103, the receiving unit 105 receives a signal transmitted from the terminal device 200 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 100 to the terminal device 200.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the physical uplink control channel (PUCCH) or the physical uplink shared channel (PUSCH) and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the sounding reference signal (SRS).

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 100 to the terminal device 200, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 200, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Terminal Device in Present Embodiment>

Figure 6:
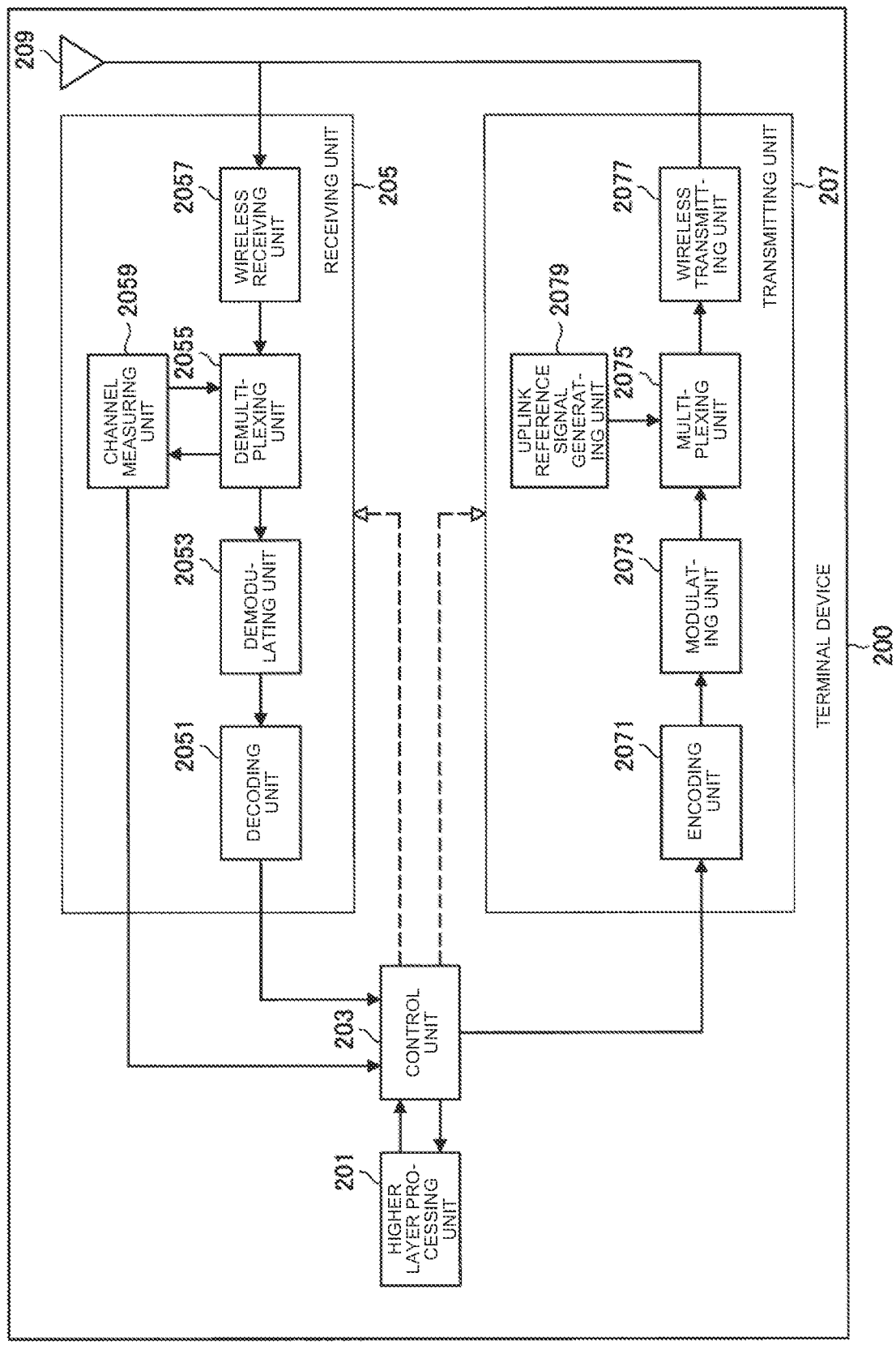
FIG. 6 is a schematic block diagram illustrating a configuration of a terminal device of the present embodiment.

FIG. 6 is a schematic block diagram illustrating a configuration of the terminal device 200 of the present embodiment. As illustrated, the terminal device 200 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 200 can support one or more RATs. Some or all of the units included in the terminal device 200 illustrated in FIG. 6 can be configured individually in accordance with the RAT. For example, the receiving unit 205 and the transmitting unit 207 are configured individually in LTE and NR. Further, in the NR cell, some or all of the units included in the terminal device 200 illustrated in FIG. 6 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 200.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 100. For example, the control information from the base station device 100 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 100 and/or a base station device 100 different from the base station device 100 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 100.

In the CSI report control in the higher layer processing unit 201, control related to the report of the CSI to the base station device 100 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 100 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 100 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 100.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 200, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 100 and the terminal device 200 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 200 of the control information specific or a common RRC signaling for notifying of the control information specific to the base station device 100. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Initial Connection Procedure According to Present Embodiment>

The initial connection is a procedure for causing the terminal device 200 to transition from a state where the terminal device 200 does not connect to any cell (an idle state) to a state where the terminal device 200 has established connection with an arbitrary cell (a connected state).

Figure 7:
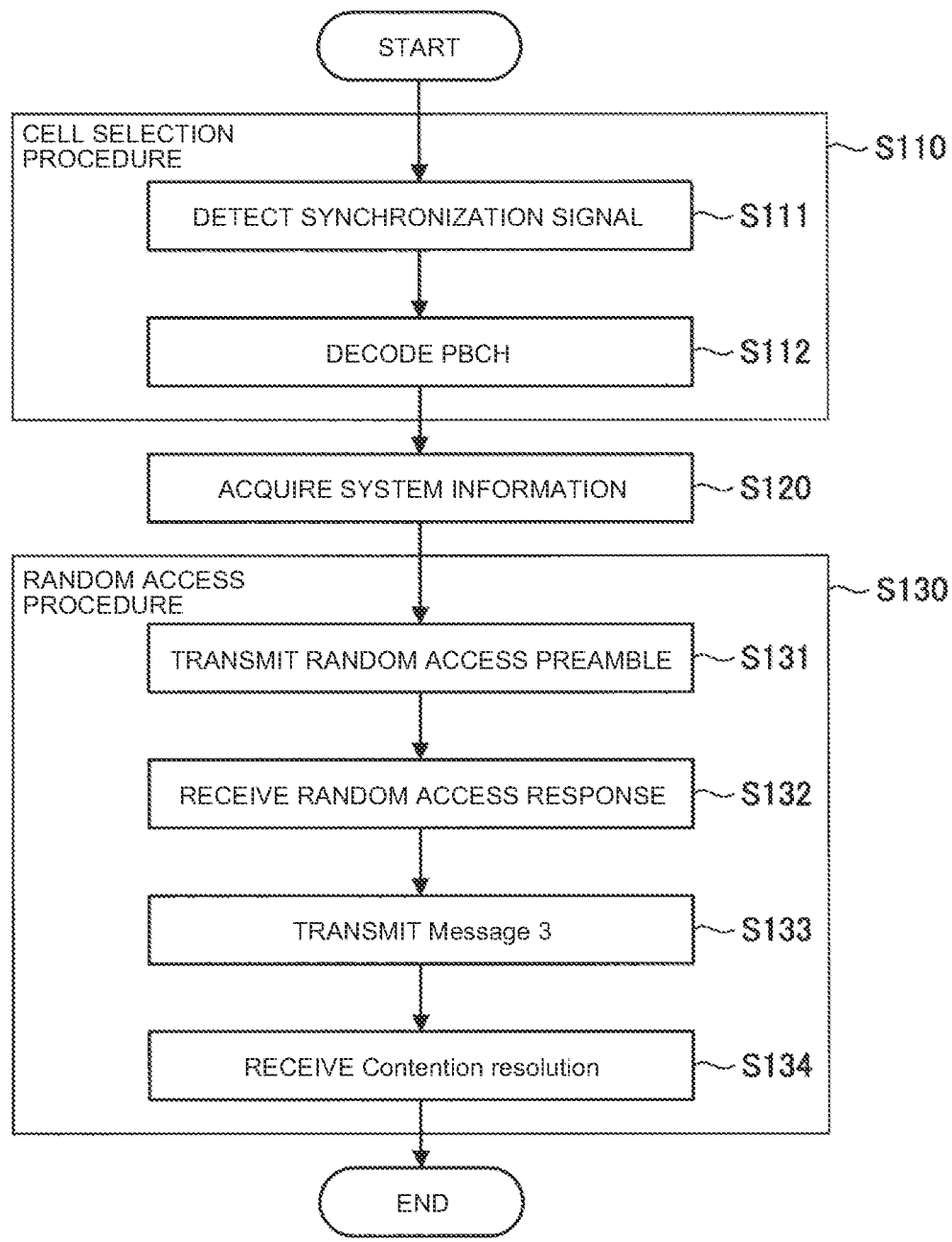
FIG. 7 is a flowchart illustrating an example of an initial connection procedure of a terminal device according to the present embodiment.

FIG. 7 is a flowchart illustrating an example of an initial connection procedure of the terminal device 200 according to the present embodiment. As illustrated in FIG. 7, the terminal device 200 in the idle state first executes a cell selection procedure (Step S110). The cell selection procedure includes a synchronization signal detection process (Step S111) and a PBCH decoding process (Step S112). On the basis of detection of a synchronization signal, the terminal device 200 synchronizes a cell with a downlink. Next, after the synchronization with the downlink is established, the terminal device 200 tries to decode a PBCH and obtains the first system information.

Next, the terminal device 200 acquires second system information on the basis of the first system information included in the PBCH (Step S120).

Next, the terminal device 200 executes random access procedure (random access procedure, RACH procedure, and RACH procedure) on the basis of the first system information and/or the second system information (Step S130). The random access procedure includes a random access preamble transmission process (Step S131), a random access response reception process (Step S132), a Message 3 transmission process (Step S133), and a contention resolution reception process (Step S134). First, the terminal device 200 selects a predetermined PRACH preamble and transmits it. Next, the terminal device 200 receives a PDSCH including a random access response corresponding to the transmitted PRACH preamble. Next, the terminal device 200 transmits a PUSCH including Message 3 by using a resource that is included in the received random access response and that is scheduled by Random Access Response Grant. Last of all, the terminal device 200 receives a PDSCH including contention resolution corresponding to the transmitted PUSCH.

The message 3 includes an RRC message for an RRC connection request. The contention resolution includes an RRC message for RRC connection setup. In a case where the terminal device 200 receives the RRC message for RRC connection setup, the terminal device 200 performs RRC connection operation, so that the state transitions from an RRC idle state to an RRC connected state. After the state transitions to the RRC connected state, the terminal device 200 transmits an RRC message for RRC connection setup completion to the base station device 100. Through this series of operation, the terminal device 200 can be connected to the base station device 100.

Note that the random access preamble will be also referred to as a message 1, the random access response will be also referred to as a message 2, the contention resolution will be also referred to as a message 4, and the message for RRC connection setup completion will be also referred to as a message 5.

After all the processes in the random access procedure finish, the terminal device 200 is capable of transitioning to the state where the terminal device 200 is connected to the cell (the connected state).

Note that, the random access procedure illustrated in FIG. 7 is also referred to as a 4-step RACH procedure. On the other hand, in a random access procedure that is also referred to as a 2-step RACH procedure, the terminal device 200 also transmits Message 3 with transmission of a random access preamble, and the base station device 100 transmits contention resolution and a random access response as a response thereto.

The random access preamble is transmitted in association with the PRACH. The random access response is transmitted in the PDSCH. The PDSCH including the random access response is scheduled by the PDCCH. The message 3 is transmitted in the PUSCH. The PUSCH including the message 3 is scheduled by an uplink grant included in the random access response.

<System Information According to Present Embodiment>

System information is information for making a notification of setting in a cell in which the system information is to be transmitted. The system information includes, for example, information regarding access to the cell, information regarding cell selection, information regarding other RAT and other systems, or the like.

The system information is classified into a master information block (MIB) and a system information block (SIB). The MIB is information that has a fixed payload size and that is broadcasted through a PBCH. The MIB includes information for acquiring the SIB. The SIB is system information other than the MIB. The SIB may be broadcasted through a PDSCH.

In addition, it is possible to classify the system information into first system information, second system information, and third system information. The first system information and the second system information include information related to access to a cell, information related to acquisition of other system information, and information related to cell selection. In LTE, information included in the MIB is deemed as the first system information, and information included in an SIB 1 and an SIB 2 is deemed as the second system information. In the case where some pieces of the first system information and the second system information have not been acquired from a certain cell, the terminal device assumes that access to the certain cell is prohibited.

The MIB is information of a physical layer that is necessary to receive the system information. The MIB includes a downlink system bandwidth, a part of system frame numbers, SIB scheduling information, or the like.

The SIB 1 is scheduling information of system information other than the SIB 1 and cell access restriction information. The SIB 1 includes cell access information, cell selection information, maximum uplink transmission power information, TDD setting information, a system information cycle, system information mapping information, length of an SI window, or the like.

The SIB 2 includes connection prohibition information, common radio resource setting information (radioResourceConfigCommon), uplink carrier information, or the like. The common radio resource setting information includes setting information of a PRACH and an RACH that are common to cells. At the time of initial access, the terminal device 200 performs the random access procedure on the basis of the setting information of the PRACH and the RACH.

<System Information of NR According to Present Embodiment>

The system information is broadcasted by an NR cell also in NR.

A physical channel that carries the system information may be transmitted by a slot or a mini-slot. The mini-slot is defined by the number of symbols that is smaller than the number of symbols of the slot. Since the physical channel that carries the system information is transmitted by the mini-slot, it is possible to shorten necessary time for the beam sweep and it is possible to reduce overhead.

The first system information is transmitted through an NR-PBCH, and the second system information is transmitted through a physical channel that is different from the NR-PBCH.

<RACH Procedure According to Present Embodiment>

An RACH procedure is performed to achieve the purpose such as RRC connection setup from an idle state to a non-active state or a connected state, request for state transition from the non-active state to the connected state, handover for switching a connected cell, scheduling request for requesting resources for uplink data transmission, timing advance adjustment for adjusting uplink synchronization, on-demand SI request for requesting system information which has not been transmitted, and recovery of beam connection which has been interrupted (beam recovery).

The RRC connection setup from the idle state to the non-active state or the connected state is operation to be performed when the terminal device 200 is connected to the base station device 100 in response to occurrence of traffic, or the like. Specifically, the RRC connection setup is operation for passing information regarding connection (for example, UE context) from the base station device 100 to the terminal device 200. The UE context is managed with predetermined terminal device identification information (for example, C-RNTI) designated from the base station device 100. When this operation is finished, the state of the terminal device 200 transitions from the idle state to the non-active state or from the idle state to the connected state.

The request for state transition from the non-active state to the connected state is operation for requesting state transition from the non-active state to the connected state in response to occurrence of traffic, or the like. By the state transitioning to the connected state, the terminal device 200 can transmit/receive unicast data to/from the base station device 100.

The handover for switching a connected cell is operation for switching connection from a cell (serving) to which the terminal device 200 is connected to a cell adjacent to the cell (neighbor cell) as a result of change of a radio wave environment by movement of the terminal device 200. The terminal device 200 which has received a handover command from the base station device 100 requests connection to the neighbor cell designated by the handover command.

The scheduling request is operation of requesting resources for uplink data transmission in response to occurrence of traffic, or the like. After the base station device 100 normally receives this scheduling request, the base station device 100 allocates PUSCH resources to this terminal device 200. Note that the scheduling request is performed also by the PUCCH.

The timing advance adjustment for adjusting uplink synchronization is operation for adjusting an error between a downlink frame and an uplink frame occurring by a propagation delay. The terminal device 200 transmits a PRACH at a timing adjusted to the downlink frame. By this means, the base station device 100 can recognize a propagation delay with the terminal device 200, so that the base station device 100 can instruct the terminal device 200 about a timing advance value using the message 2, or the like.

The on-demand SI request for requesting system information which has not been transmitted is operation of requesting the base station device 100 to transmit the system information in a case where the system information which has not been transmitted for the purpose of an overhead, or the like, of the system information is necessary for the terminal device 200.

The recovery of beam connection which has been interrupted (beam recovery) is operation of requesting recovery in a case where communication quality degrades due to movement of the terminal device 200, interruption of a communication path by other objects, or the like, after a beam is established. The base station device 100 which has received this request tries connection to the terminal device 200 using different beams.

The RACH procedure further includes a contention-based RACH procedure and a non-contention RACH procedure.

The contention-based RACH procedure is an RACH procedure performed on the initiative of the terminal device 200. The contention-based RACH procedure is a procedure including four steps starting from transmission of the message 1 from the terminal device 200. The terminal device 200 selects from a plurality of RACH resources and a plurality of PRACH preambles set in advance and transmits a PRACH. Because these plurality of RACH resources and plurality of PRACH preambles are shared with other terminal devices 200, there is a case where PRACHs may contend with each other.

Figure 8:
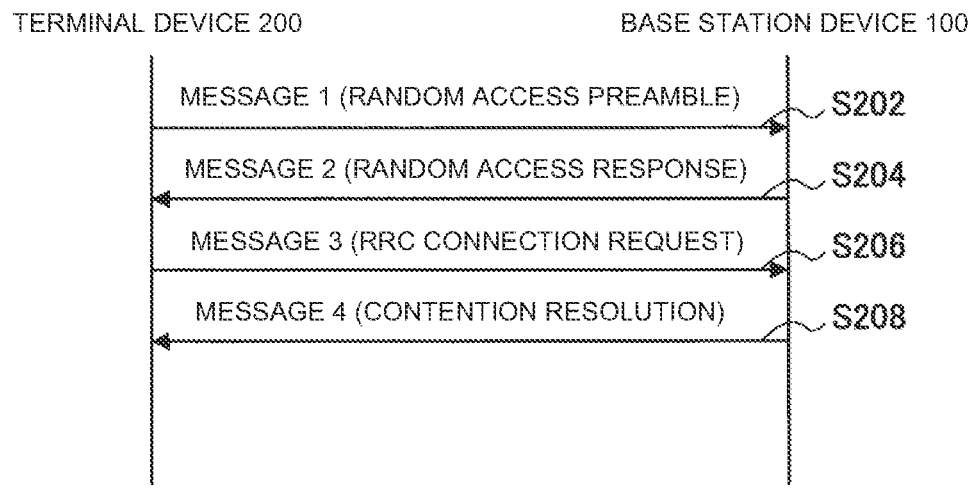
FIG. 8 is a sequence diagram illustrating an example of flow of a contention-based RACH procedure according to the present embodiment.

FIG. 8 is a sequence diagram illustrating an example of flow of the contention-based RACH procedure according to the present embodiment. As illustrated in FIG. 8, first, the terminal device 200 transmits a random access preamble which is also referred to as the message 1 to the base station device 100 (Step S202). Then, the base station device 100 transmits the random access response which is also referred to as the message 2 to the terminal device 200 (Step S204). Then, the terminal device 200 transmits the RRC message for RRC connection request which is also referred to as the message 3 to the base station device 100 (Step S206). Then, the base station device 100 transmits the contention resolution which is also referred to as the message 4 to the terminal device 200 (Step S208).

The non-contention RACH procedure is an RACH procedure performed on the initiative of the base station device 100. The non-contention RACH procedure is a procedure including three steps starting from transmission of a PDCCH order from the base station device 100. The terminal device 200 transmits the random access preamble using the PRACH indicated in the PDCCH order. By the base station device 100 scheduling the random access preamble, contention of the PRACHs is less likely to occur.

Figure 9:
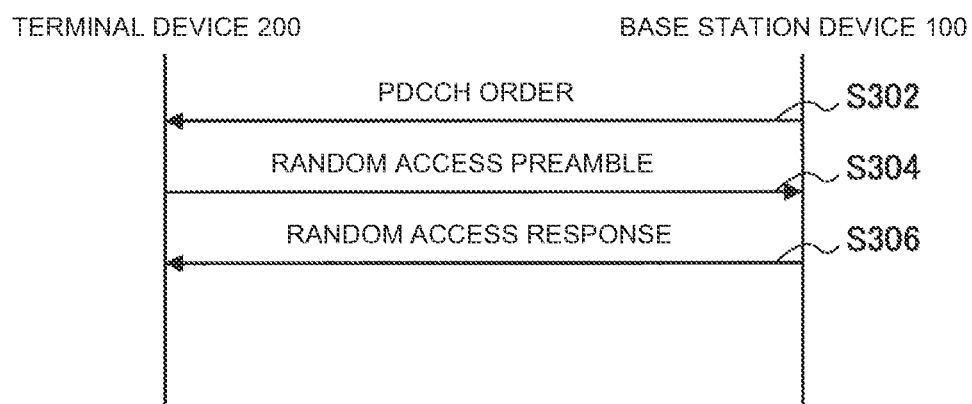
FIG. 9 is a sequence diagram illustrating an example of flow of a non-contention RACH procedure according to the present embodiment.

FIG. 9 is a sequence diagram illustrating an example of flow of the non-contention RACH procedure according to the present embodiment. As illustrated in FIG. 9, first, the base station device 100 transmits the PDCCH order to the terminal device 200 (Step S302). Then, the terminal device 200 transmits the random access preamble to the base station device 100 (Step S304). Then, the base station device 100 transmits the random access response to the terminal device 200 (Step S306).

<Details of NR-PRACH According to Present Embodiment>

An NR-PRACH is constituted using a Zadoff-Chu sequence or an M sequence. In the NR-PRACH, a plurality of preamble formats is specified. The preamble formats are specified using combination of parameters such as a sub-carrier interval of the PRACH, a transmission bandwidth, a sequence length, the number of symbols to be used for transmission, the number of repetitions of transmission, a CP length, and a guard period length. Note that a type (the Zadoff-Chu sequence or the M sequence) of the sequence to be used for transmission of the NR-PRACH may be designated in accordance with the preamble formats.

Setting regarding the NR-PRACH is made using the system information on the terminal device 200 in an idol mode. Further, setting regarding the NR-PRACH is made through dedicated RRC signaling on the terminal device 200 in a connection mode.

The NR-PRACH is transmitted with physical resources (NR-PRACH occasion) with which the NR-PRACH can be transmitted. The physical resources are indicated by setting regarding the NR-PRACH. The terminal device 200 selects one of the physical resources and transmits the NR-PRACH. Further, the terminal device 200 in the connection mode transmits the NR-PRACH using the NR-PRACH resource. The NR-PRACH resource is combination of the NR-PRACH preamble and its physical resource. The base station device 100 can instruct the terminal device 200 about the NR-PRACH resource.

Types of sequences of the preamble of the NR-PRACH are numbered. Numbers of the types of the sequences of the preamble will be referred to as preamble indexes.

The NR-PRACH is retransmitted when a random access procedure is failed. The terminal device 200 causes transmission of the NR-PRACH to wait during a waiting period calculated from a back-off value (back-off indicator, BI) upon retransmission. Note that the back-off value may be different in accordance with a terminal category of the terminal device 200 or priority of traffic which has occurred. In this event, a notification of a plurality of back-off values is made, and the terminal device 200 selects a back-off value to be used in accordance with the priority. Further, upon retransmission of the NR-PRACH, transmission power of the NR-PRACH is increased compared to that of the first transmission (this procedure is referred to as power ramping).

<Details of NR Random Access Response According to Present Embodiment>

The NR random access response is transmitted using an NR-PDSCH.

The NR-PDSCH including the random access response is scheduled by the NR-PDCCH in which a CRC is scrambled by an RA-RNTI. The NR-PDCCH is transmitted using a common control subband. The NR-PDCCH is arranged in common search space (CSS). Note that a value of the RA-RNTI is determined on the basis of transmission resources (time resources (slots or sub frames) and frequency resources (resource blocks)) of the NR-PRACH corresponding to the random access response. Note that the NR-PDCCH may be arranged in search space associated with the NR-PRACH which is associated with the random access response. Specifically, the search space in which the NR-PDCCH is arranged is set in association with physical resources in which the preamble of the NR-PRACH and/or the NR-PRACH is transmitted. The search space in which the NR-PDCCH is arranged is set in association with the preamble index and/or the index of the physical resources.

The NR-PDCCH is NR-SS and QCL.

The NR random access response is information of MAC. The NR random access response includes at least an uplink grant for transmitting the message 3 of the NR, a timing advance value to be used for adjusting uplink frame synchronization, and a value of a temporal C-RNTI. Further, the NR random access response includes a PRACH index used for NR-PRACH transmission corresponding to the random access response. Further, the NR random access response includes information regarding back-off to be used for causing transmission of the PRACH to wait. The base station device 100 transmits these kinds of information in the NR-PDSCH. The terminal device 200 judges whether or not transmission of the random access preamble has succeeded or has been failed from these kinds of information. In a case where it is judged from these kinds of information that transmission of the random access preamble has been failed, the terminal device 200 preforms a transmission process of the message 3 of the NR in accordance with the information included in the random access response. Meanwhile, in a case where it is judged that transmission of the random access preamble has been failed, the terminal device 200 regards the random access procedure as having being failed and performs a retransmission process of the NR-PRACH.

Note that the NR random access response may include a plurality of uplink grants for transmitting the message 3 of the NR. The terminal device 200 can select one resource to be used for transmitting the message 3 from the plurality of uplink grants. By this means, it is possible to relieve contention of transmission of the message 3 of the NR in a case where the same NR random access response is received at different terminal devices 200, so that it is possible to provide a more stable random access procedure.

<Details of Message 3 of NR According to Present Embodiment>

The message 3 of the NR is transmitted using the NR-PUSCH. The NR-PUSCH is transmitted using resources indicated by the random access response.

The message 3 of the NR includes the RRC connection request message.

A waveform of the transmitted NR-PUSCH including the message 3 of the NR is indicated by a parameter included in the system information. Specifically, OFDM or DFT-s-OFDM is determined by indication of the parameter.

The process of the base station device 100 transitions to a transmission process of contention resolution in a case where the base station device 100 normally receives the message 3 of the NR. Meanwhile, in a case where the base station device 100 cannot normally receive the message 3 of the NR, the base station device 100 can try reception of the message 3 of the NR again at least for a predetermined period.

As a specific example of a process after the message 3 of the NR cannot be normally received, the base station device 100 instructs the terminal device 200 to retransmit the message 3. The base station device 100 transmits an instruction of retransmission of the message 3 using a downlink resource a predetermined number of slots (or sub frames, wireless frames) after the resource in which an instruction of retransmission of the message 3 is transmitted.

As an example of an instruction of retransmission of the message 3 and a transmission resource, there is an instruction by retransmission of the random access response. The NR-PDSCH including the random access response to be retransmitted is scheduled by the NR-PDCCH in which a CRC is scrambled by the RA-RNTI. As a value of the RA-RNTI, a value which is the same as the value of the RA-RNTI used in the first transmission is used. That is, the value of the RN-RNTI is determined on the basis of the transmission resource of the NR-PRACH corresponding to the random access response. Alternatively, the value of the RA-RNTI may be determined on the basis of information for identifying the first transmission or retransmission, in addition to the transmission resource of the NR-PRACH. The NR-PDCCH is arranged in common search space (CSS).

Alternatively, the NR-PDSCH including the random access response to be retransmitted is scheduled by the NR-PDCCH in which a CRC is scrambled by the temporal C-RNTI or the C-RNTI included in the random access response transmitted in the first transmission.

As another example of the instruction of retransmission of the message 3 and the transmission resource, there is an instruction using the NR-PDCCH to be used for the instruction of retransmission of the message 3. The NR-PDCCH is an uplink grant. A resource for retransmission of the message 3 is indicated by the DCI of the NR-PDCCH. The terminal device 200 retransmits the message 3 on the basis of the instruction of the uplink grant.

As a specific example of a process after the message 3 of the NR cannot be normally received, the base station device 100 tries to receive the message 3 using a resource for retransmission indicated in advance.

In a case where contention resolution is not transmitted from the base station device 100 within a predetermined period after the message 3 is transmitted, the terminal device 200 transmits the NR-PUSCH including the message 3 using the resource for retransmission indicated in advance.

Alternatively, in a case where the terminal device 200 receives a NACK in response to the message 3, the terminal device 200 transmits the NR-PUSCH including the message 3 using the resource for retransmission indicated in advance corresponding to the NACK.

The resource for retransmission indicated in advance is included in, for example, the system information or the random access response.

Note that, in a case where the number of times of retransmission of the message 3 of the NR exceeds the predetermined number of times, or in a case where reception of contention resolution of the NR has not been succeeded within a predetermined period, the terminal device 200 regards the random access procedure as having been failed, and performs a retransmission process of the NR-PRACH.

Note that a transmission beam of the terminal device 200 to be used for retransmission of the message 3 of the NR may be different from a transmission beam of the terminal device 200 used for the first transmission of the message 3.

Note that, in a case where neither the contention resolution of the NR nor the instruction of retransmission of the message 3 can be received within a predetermined period, the terminal device 200 regards the random access procedure as having been failed, and performs a retransmission process of the NR-PRACH. The predetermined period is set by, for example, the system information.

<Details of Contention Resolution of NR According to Present Embodiment>

The contention resolution of the NR is transmitted using the NR-PDSCH.

The NR-PDSCH including the contention resolution is scheduled by the NR-PDCCH in which a CRC is scrambled by the temporal C-RNTI or the C-RNTI. The NR-PDCCH is transmitted using a common control subband. The NR-PDCCH is arranged in UE specific search space (USS). Note that the NR-PDCCH may be arranged in CSS.

The terminal device 200 returns an ACK to the base station device 100 in a case where the terminal device 200 normally receives the NR-PDSCH including the contention resolution. Thereafter, the terminal device 200 is put into a connected state by this random access procedure being regarded as succeeding. Meanwhile, in a case of receiving a NACK to the NR-PDSCH including the contention resolution from the terminal device 200 or in a case where there is no response, the base station device 100 retransmits the NR-PDSCH including the contention resolution. Further, in a case where the terminal device 200 cannot receive the contention resolution of the NR within the predetermined period, the terminal device 200 regards the random access procedure as having been failed, and performs a retransmission process of the NR-PRACH.

<Uplink Synchronization Adjustment According to Present Embodiment>

Uplink signals from a plurality of terminal devices 200 are preferably received at the base station device 100 at the same timing. To achieve this, transmission timings of the uplink signals are adjusted while a difference in a propagation delay due to a difference in a distance to the base station device 100 is taken into consideration. This point will be described with reference to FIG. 10.

Figure 10:
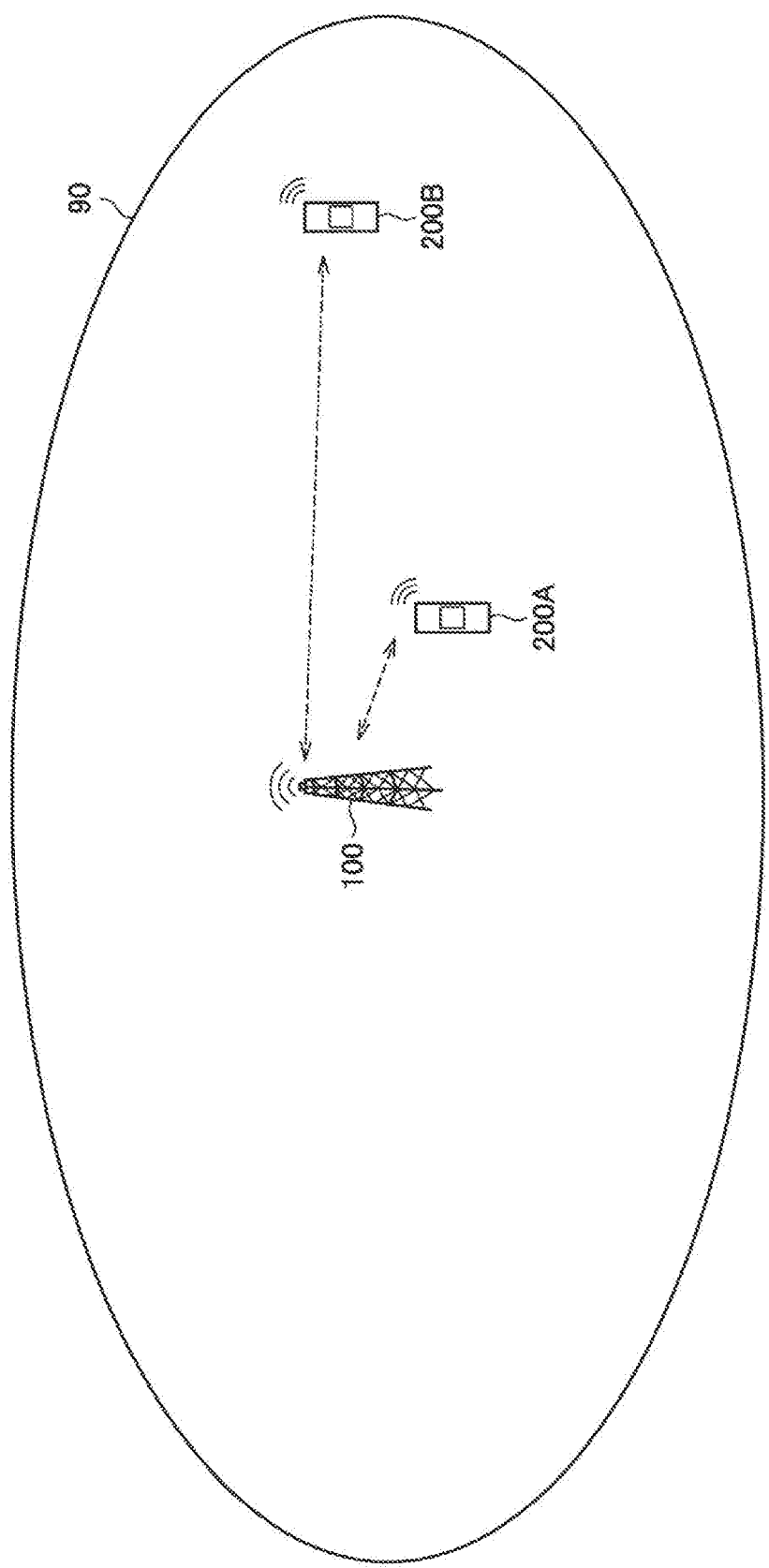
FIG. 10 is a diagram for explaining an example of uplink synchronization adjustment according to the present embodiment.

FIG. 10 is a diagram for explaining an example of uplink synchronization adjustment according to the present embodiment. In the example illustrated in FIG. 10, a terminal device 200A is located in the vicinity of the base station device 100 within a cell 90 provided by the base station device 100, and a terminal device 200B is located far from the base station device 100. A case will be assumed where these terminal devices 200 perform uplink communication at the same time. In a case where the terminal devices 200A and 200B transmit uplink signals at transmission timings based on a downlink synchronization timing, the respective uplink signals are received at the base station device 100 at different reception timings due to different propagation delays and process delays specific to the terminal devices 200. In a case where the reception timings of the respective uplink signals are different, inter-symbol interference can occur, and characteristics can degrade.

Therefore, the transmission timing of the uplink signal at the terminal device 200 is adjusted to be advanced so that the transmission timing of the downlink signal is aligned with the reception timing of the uplink signal at the base station device 100.

Figure 11:
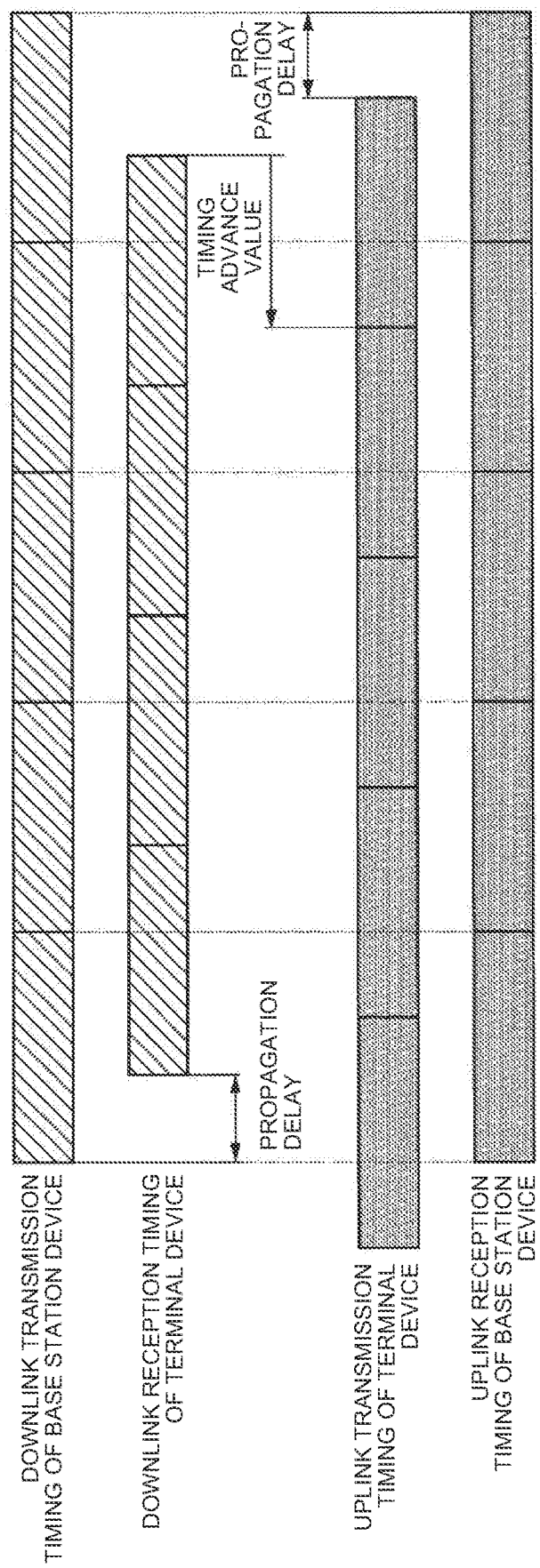
FIG. 11 is a diagram for explaining an example of uplink synchronization adjustment according to the present embodiment.

FIG. 11 is a diagram for explaining an example of uplink synchronization adjustment according to the present embodiment. FIG. 11 illustrates the downlink transmission timing of the base station device 100 at the first stage from the top, and illustrates the downlink reception timing of the terminal device 200 at the second stage from the top. Further, the uplink transmission timing of the terminal device 200 is illustrated at the third stage from the top, and the uplink reception timing of the base station device 100 is illustrated at the fourth stage from the top. Each stage includes a plurality of rectangles and one rectangle indicates one wireless frame. As indicated in the first and the second stages, the downlink signal from the base station device 100 is received at the terminal device 200 with a delay of a predetermined time period by influence of a propagation delay and a process delay of the terminal device 200. The terminal device 200 adjusts the uplink transmission timing using the timing advance value indicated from the base station device 100 on the basis of the timing at which the downlink signal is received. In detail, as indicated in the third stage, the terminal device 200 transmits the uplink physical signal earlier by a period corresponding to the timing advance value from the corresponding reception timing of the downlink signal. By this means, as indicated in the fourth stage, the adjusted uplink signal of the terminal device 200 is received at the base station device 100 at the same timing as the downlink transmission timing.

Note that the timing advance value is calculated as approximately double a one-way delay period.

The timing advance value is unique to the terminal device 200. The terminal device 200 is uniquely notified of the timing advance value.

The PRACH is used for calculation of the timing advance value. The random access response (RAR) is used for notification of the timing advance value. An example of calculation of the timing advance value by the base station device 100 and a procedure regarding application of the timing advance value by the terminal device 200 will be described below with reference to FIG. 12.

Figure 12:
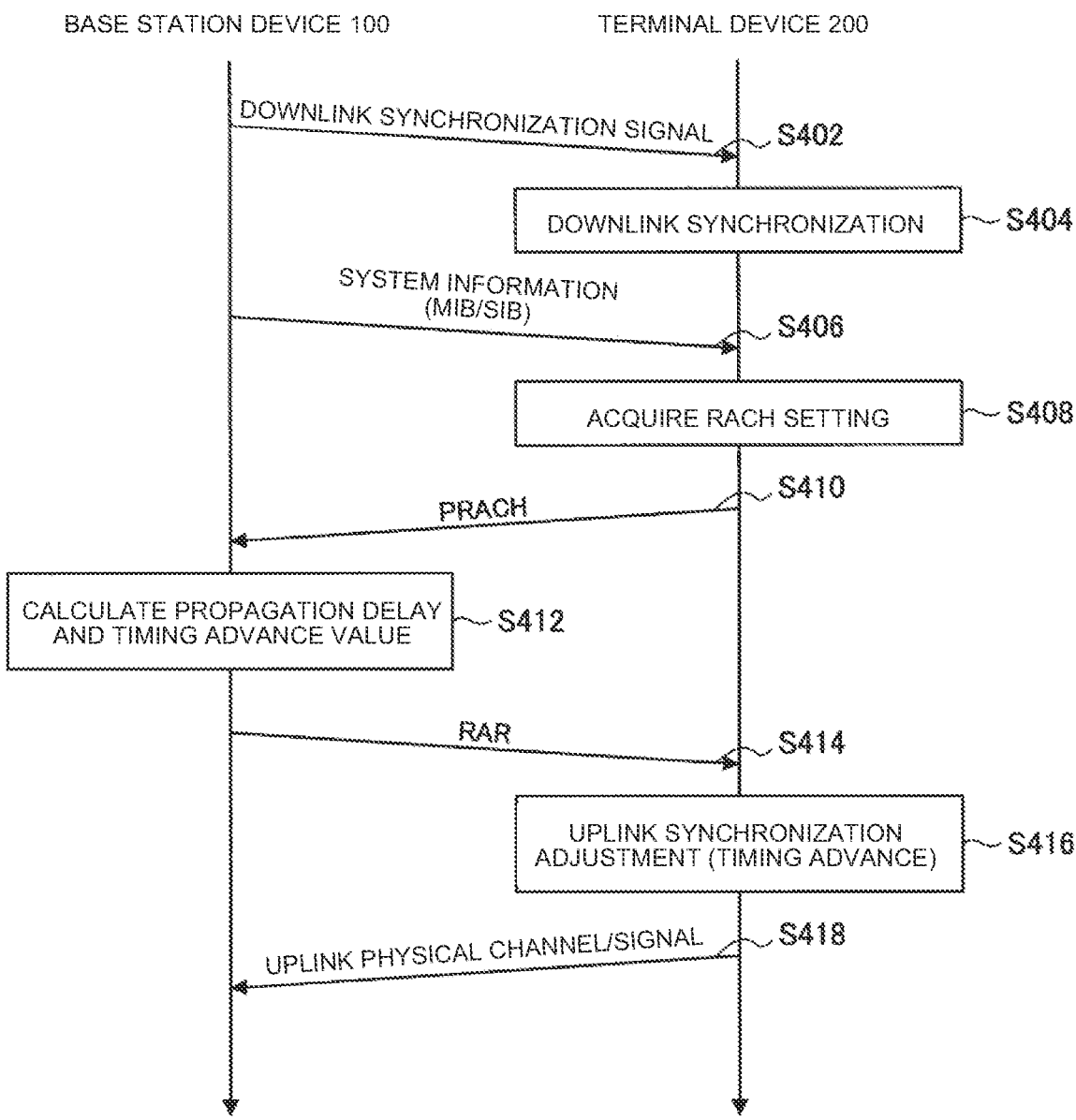
FIG. 12 is a sequence diagram illustrating an example of flow of an uplink synchronization adjustment procedure according to the present embodiment.

FIG. 12 is a sequence diagram illustrating an example of flow of an uplink synchronization adjustment procedure according to the present embodiment. As illustrated in FIG. 12, the base station device 100 transmits downlink synchronization signals (a primary synchronization signal (PSS) and a secondary synchronization signal (SSS)) to the terminal device 200 (Step S402). Then, the terminal device 200 performs downlink synchronization on the basis of the downlink synchronization signals transmitted from the base station device 100 (Step S404). Next, the base station device 100 transmits system information (MIB and SIB) (Step S406). Then, the terminal device 200 receives the system information and acquires RACH setting from the received system information (Step S408). Then, the terminal device 200 transmits the PRACH on the basis of a frame timing synchronized by the downlink synchronization signals (Step S410). The base station device 100 calculates a propagation delay and a timing advance value on the basis of a difference between the reception timing of the PRACH and a timing of the uplink frame of the base station device 100 (Step S412). Further, the base station device 100 transmits a random access response (RAR) including the timing advance value to the terminal device 200 (Step S414). Then, the terminal device 200 acquires the timing advance value from the received RAR and performs adjustment to advance the uplink transmission timing (Step S416). Thereafter, the terminal device 200 transmits uplink physical channels/signals such as the PUSCH, the PUCCH and the SRS at the uplink transmission timing adjusted in Step S416 (Step S418).

<Non-Terrestrial Network According to Present Embodiment>

In cellular mobile communication, a wireless network is constituted with cells (macro cells, micro cells, femto cells or small cells) which are constituted with base station devices or relay devices (hereinafter, also referred to as ground station devices) provided on the ground. The wireless network provided from the ground stations will be referred to as a terrestrial network. Meanwhile, provision of a wireless network from an device other than the ground station device, such as a satellite station device (a satellite base station device, a satellite relay station device, or a space station) which orbits around the earth, an aircraft (aerial vehicle), and an device such as a drone which floats in the air, is studied in response to a request for reduction in cost of the bases station device, provision of coverage of an area where a radio wave is difficult to reach from the base station device, or the like. This wireless network provided from a device other than the ground station device will be referred to as a non-terrestrial network.

Examples of the non-ground station device can include a satellite station device and an aircraft station device. The satellite station device is a device having a wireless communication function, which is constituted as a device such as artificial satellite, floating outside the atmosphere. The satellite station device according to the present embodiment can be constituted with a low earth orbiting (LEO) satellite, a medium earth orbiting (MEO) satellite, a geostationary earth orbiting (GEO) satellite, a highly elliptical orbiting (HEO) satellite, or the like. The aircraft station device is a device having a wireless communication function, which is constituted as a device floating in the atmosphere, such as an aircraft and a balloon. The aircraft station device according to the present embodiment can be constituted with unmanned aircraft systems (UAS), a tethered UAS, a lighter than air UAS (LTA), a heavier than air UAS (HTA), high altitude UAS platforms (HAPs), or the like.

Figure 13:
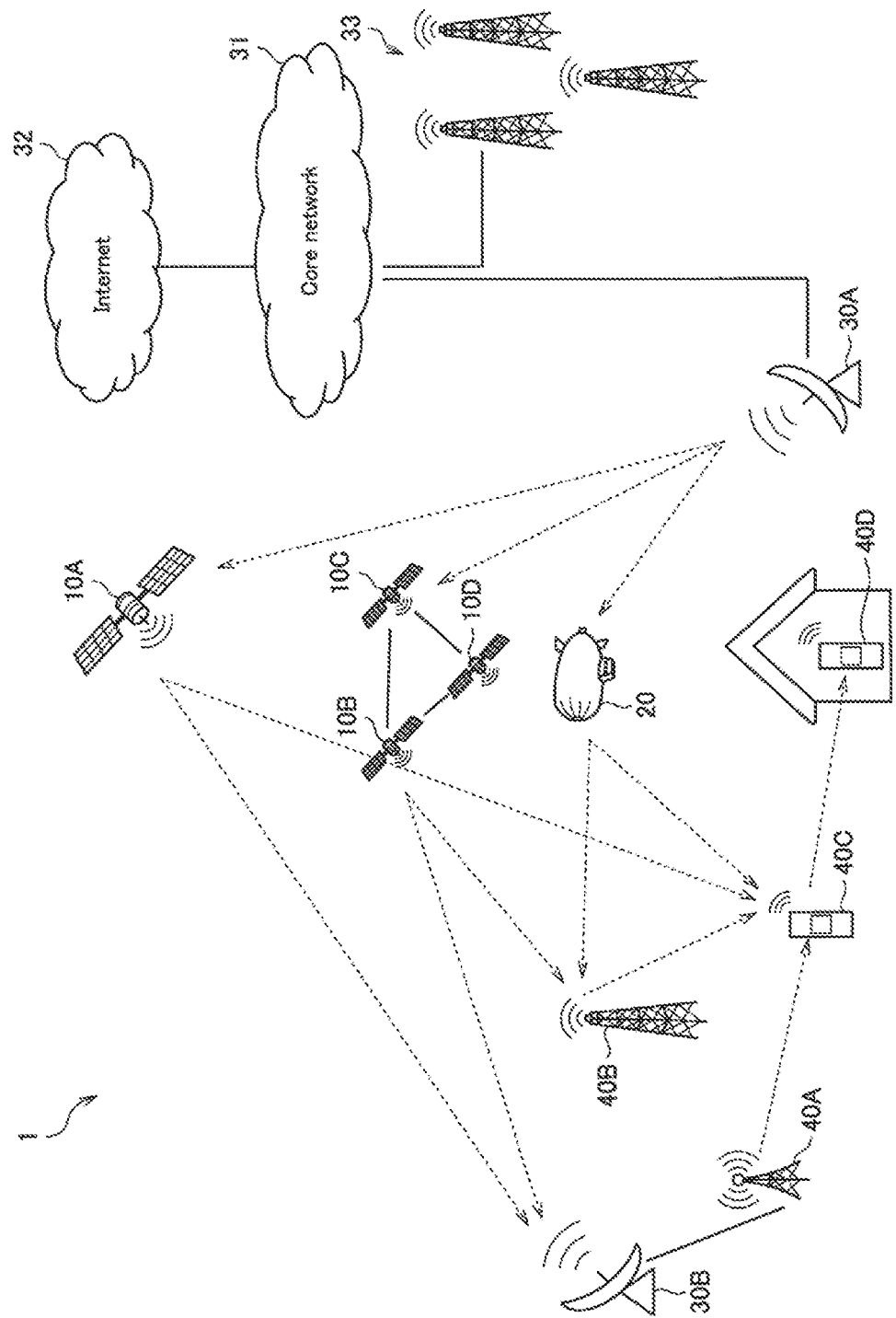
FIG. 13 is a diagram illustrating an example of a non-terrestrial network according to the present embodiment.

FIG. 13 is a diagram illustrating an example of the non-terrestrial network according to the present embodiment. A system 1 illustrated in FIG. 13 is a non-terrestrial network including a satellite station device 10A configured as a geostationary earth orbiting satellite, satellite station devices 10B to 10D configured as low earth orbiting satellites, and an aircraft station device 20 configured as an unmanned aircraft system. These satellite station devices 10 and the aircraft station device 20 are connected to a device provided on the ground via a relay station 30. For example, the satellite station device 10 and the aircraft station device 20 are connected to a core network 31 via a relay station 30A, and is connected to the Internet 32 and a terrestrial network 33 via the core network 31. Further, the satellite station devices 10A and 10B are connected to a femto cell base station 40A which provides a femto cell, via the relay station 30B. The relay station 30 is also referred to as an earth station (very small aperture terminal (VSAT)), and further also referred to as a control earth station or a HUB station. The satellite station device 10 and the aircraft station device 20 may be directly connected to a device provided on the ground without involving a VSAT 30. For example, the satellite station device 10B and the aircraft station device 20 are directly connected to a macrocell base station 40B.

The satellite station device 10 and the aircraft station device 20 perform communication with the terminal device (also referred to as an earth terminal device) 40 corresponding to the non-terrestrial network. The earth terminal device 40 includes a mobile phone, a smartphone, an automobile, a bus, a train, an aircraft, a machine to machine (M2M) device, an internet of things (IoT) device, a relay station which relays satellite communication, and a base station device which transmits/receives satellite communication. In the example illustrated in FIG. 13, the macrocell base station 40B and a UE 40C correspond to the earth terminal devices 40. The femto cell base station 40A connected to the non-terrestrial network through relay by the VSAT 30B and a UE 40D connected to the non-terrestrial network through relay by the UE 40C may be also regarded as the earth terminal devices 40 which support the non-terrestrial network.

The satellite station device 10 and the aircraft station device 20 can transmit/receive uplink traffic and downlink traffic to/from the earth terminal device 40. For example, the satellite station devices 10A and 10B and the aircraft station device 20 transmit/receive uplink traffic and downlink traffic to/from the UE 40C.

The satellite station device 10 and the aircraft station device 20 can transmit/receive backhaul traffic (in other words, backhaul signals) to/from the earth terminal device 40. For example, the satellite station devices 10A and 10B transmit/receive backhaul traffic for communication performed between the femto cell base station 40A and the UE 40C, to/from the femto cell base station 40A via the VSAT 30B. Further, the satellite station device 10B and the aircraft station device 20 directly transmit/receive backhaul traffic for communication performed between the macrocell base station 40B and the UE 40C, to/from the macrocell base station 40B.

<Satellite Communication According to Present Embodiment>

The satellite communication according to the present embodiment refers to communication between the satellite station device 10 and the earth terminal device 40.

The satellite station device 10 is mainly divided into a geostationary earth orbiting satellite station device constituted with a geostationary earth orbiting satellite and a low earth orbiting satellite station device constituted with a low earth orbiting satellite. The geostationary earth orbiting satellite station is located at altitude of 35,786 km and orbits around the earth at the same speed as rotational speed of the earth. The geostationary earth orbiting satellite station device is a satellite station device whose relative speed with respect to the earth terminal device 40 is substantially 0, and which is observed from the earth terminal device 40 as if it remained still. The low earth orbiting satellite station device is typically located at altitude of 500 km to 2,000 km, and orbits around the earth at altitude lower than the geostationary earth orbiting satellite station device. Unlike with the geostationary earth orbiting satellite station device, the low earth orbiting satellite station device has relative speed with respect to the earth terminal device 40 and is observed from the earth terminal device 40 as if it moved.

The satellite station device 10 can provide a cell with a size in accordance with the altitude. This point will be described with reference to FIG. 14.

Figure 14:
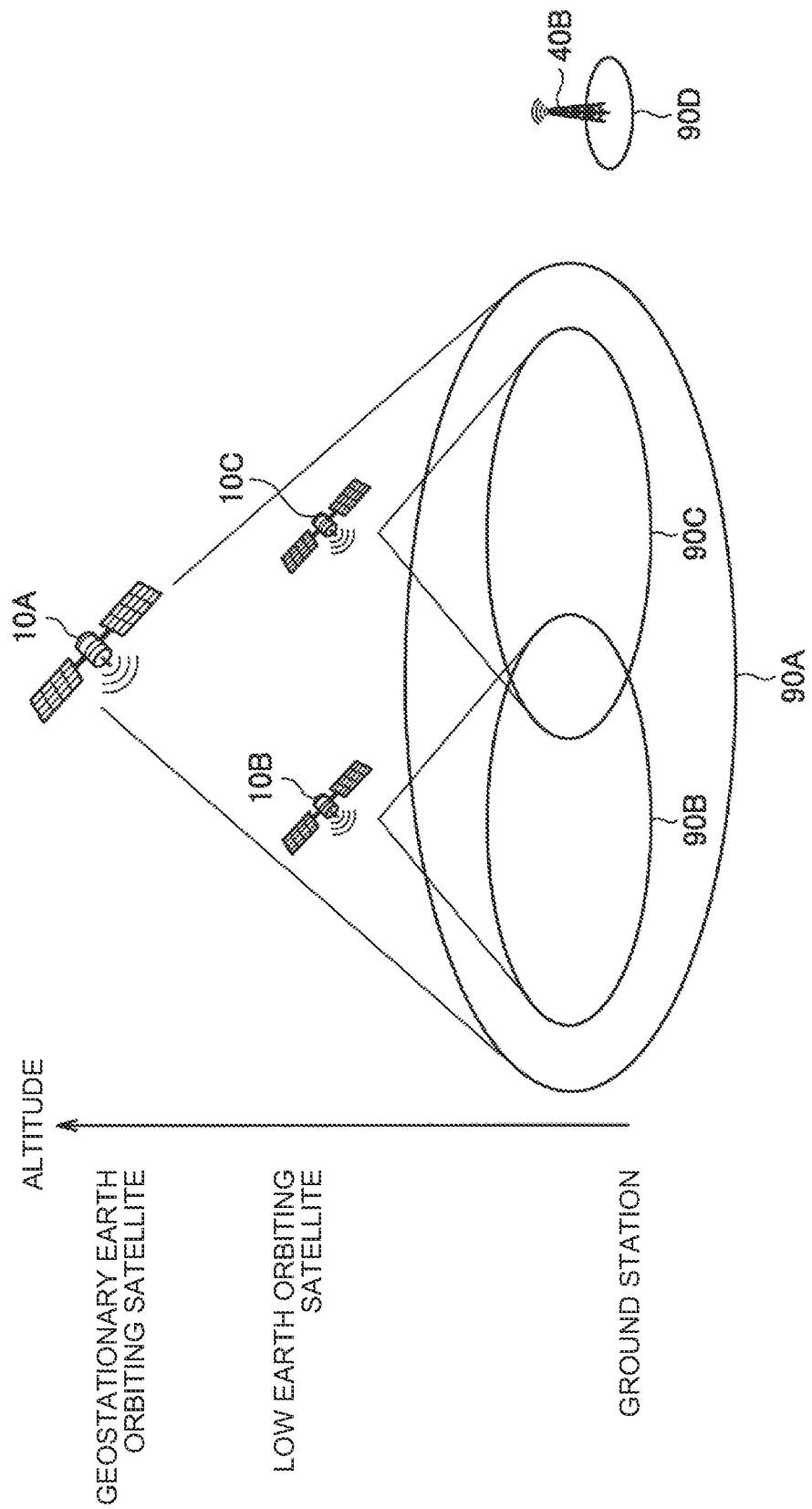
FIG. 14 is a diagram for explaining an example of a cell provided by a satellite station device according to the present embodiment.

FIG. 14 is a diagram for explaining an example of a cell provided by the satellite station device 10 according to the present embodiment. A satellite station device 10A illustrated in FIG. 14 is a geostationary earth orbiting satellite station device, and satellite station devices 10B and 10C are low earth orbiting satellite station devices. As illustrated in FIG. 14, the low earth orbiting satellite station devices 10B and 10C provide cells 90B and 10C which are larger than a cell 90D provided by the macrocell base station 40B on the ground. Further, the geostationary earth orbiting satellite station device 10A provides a cell 90A which is larger than the cells 90B and 10C provided by the low earth orbiting satellite station devices 10B and 10C.

As a cell becomes larger, a difference in a distance to the satellite station device 10 among a plurality of earth terminal devices 40 located within the cell becomes larger, which results in increase in a difference in a propagation delay. Further, because, as the altitude is higher, a distance between the satellite station device 10 and the earth terminal device 40 becomes longer, a propagation delay becomes larger.

Figure 15:
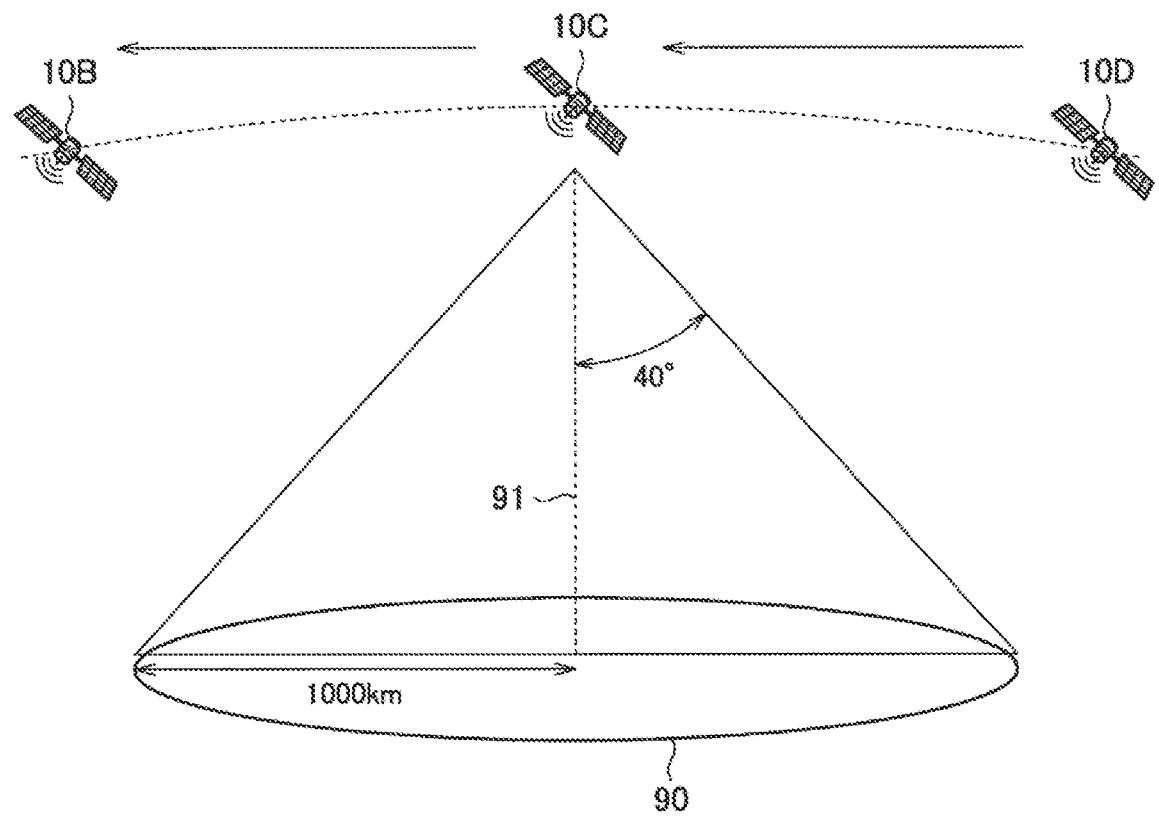
FIG. 15 is a diagram for explaining an example of a cell provided by a low earth orbiting satellite station device according to the present embodiment.

FIG. 15 is a diagram for explaining an example of a cell provided by the low earth orbiting satellite station device according to the present embodiment. As illustrated in FIG. 15, the low earth orbiting satellite station devices 10B, 10C and 10D orbit on a low earth orbit. These low earth orbiting satellite station devices 10 provide satellite communication to the earth terminal device 40 by constructing predetermined directionality toward the ground. In the example illustrated in FIG. 15, the low earth orbiting satellite station device 10 transmits/receives signals with an angle of a beam width set at 40 degrees, and, as a result, the cell 90 becomes a circle having a radius of 1,000 km. Note that the angle of the beam width is defined as an angle in a direction in which directional gain becomes ½ of maximum directional gain on the basis of a direction in which maximum directional gain can be obtained (a vertical line 91 in the example illustrated in FIG. 15). Note that these numerical values are merely an example. The low earth orbiting satellite station device 10 moves at predetermined relative speed with respect to the ground. Therefore, the cell 90 provided by the low earth orbiting satellite station device 10 moves on the ground at predetermined speed. In a case where it becomes difficult to provide satellite communication to the earth terminal device 40, satellite communication is provided from the subsequent low earth orbiting satellite (neighbor satellite station).

In the non-terrestrial network, it is expected that the following requirements are satisfied.

service extension to a terminal device (mainly an IoT/MTC device and public safety/critical communication) located in an area which cannot be covered by the terrestrial network.

service reliability and recoverability for reducing service vulnerability to physical attack or natural disaster connection and provision of service to passengers of an airplane or an aircraft terminal device such as a drone connection and provision of service to a mobile body terminal device such as a ship and a train provision of high-efficiency multicast/broadcast service such as A/V (audio/visual) content, group communication, IoT broadcast service, software download and an urgent message traffic offload between the terrestrial network and the non-terrestrial network To satisfy these requirements, in the non-terrestrial network, it is desirable to realize integration of operation in a higher layer, and commonality of wireless interface among wireless access technologies such as the NR and the LTE.

2. TECHNICAL PROBLEMS

In the LTE, adjustment of uplink synchronization has been performed using filtering, timing advance and cyclic prefix (CP). However, because the filtering, the timing advance and the CP used in the LTE are designed assuming ground station devices, they are not appropriate for satellite communication in which a propagation delay which is further larger than that in the LTE can occur. This point will be described in detail below regarding the timing advance.

The timing advance value is derived from the following equation (1).

$$TA = (N_{TA} + N_{TAoffset}) T_s \quad (1)$$

Here, TA is a timing advance value. $N_{TA}$ is a variable number for adjusting the timing advance value. $N_{TA}$ can take a value equal to or greater than 0 and equal to or less than 20512 (that is, $0 \leq N_{TA} \leq 20512$). $N_{TAoffset}$ is an offset for adjusting the timing advance value. $N_{TAoffset}$ is 0 if a duplex system is FDD (that is, $N_{TAoffset}=0$), and is 624 if the duplex system is TDD (that is, $N_{TAoffset}=624$). Ts is a predetermined value indicating an adjusted particle size. In detail, Ts is a sampling interval of FFT, and is defined as Ts=1/(subcarrier interval×2048) seconds. As an example, in a case where the subcarrier interval is 15 kHz, Ts becomes 1/(15000×2048) seconds.

If $N_{TAoffset}$ is not taken into consideration to simplify description, TA can take a value equal to or less than 20512×Ts (that is, $0 \leq TA \leq 20512 \times Ts$). In other words, TA can take a value equal to or greater than 0 ms and equal to 0.67 ms (that is, $0 \text{ ms} \leq TA \leq 0.67 \text{ ms}$).

A range of the timing advance value is set so as to be able to correspond to a minimum value and a maximum value of a propagation delay difference which can occur within the cell. In the LTE, because a base station device is provided on the ground, a propagation delay difference between a terminal device and the base station device becomes a minimum value in a case where the terminal device and the base station device exist at the same point, and becomes a maximum value in a case where the terminal device exists at a cell edge.

In the LTE, coverage provided by the base station device falls within a range between 0 and 100 km, and a distance between the base station device and the terminal device falls within a range between 0 and 100 km. Therefore, the above-described range ($0 \leq TA \leq 20512 \times Ts$, that is, 0 ms $\leq TA \leq 0.67$ ms) is sufficient as a range of the timing advance value regarding uplink transmission.

Meanwhile, in a case of satellite communication, a distance between the satellite station device and the earth terminal device drastically increases compared to a case of the LTE. Therefore, a minimum propagation delay and a maximum propagation delay relating to communication between the satellite station device and the earth terminal device drastically increases compared to a case of the LTE.

The minimum propagation delay is a propagation delay in a case where the earth terminal device is located immediately below (that is, on a vertical line) of the satellite station device. For example, in a case where the satellite station device is a low earth orbiting satellite, the altitude of the satellite station device is from 500 km to 2,000 km, and the minimum propagation delay at each altitude falls within a range between 3.3 ms and 13.3 ms.

The maximum propagation delay is a propagation delay in a case where the earth terminal device is located at a cell edge of the satellite station device. For example, in a case where the satellite station device is a low earth orbiting satellite, the altitude of the satellite station device is from 500 km to 2,000 km, and the maximum propagation delay at each altitude in a low earth orbiting satellite cell using parameters in FIG. 15 fall within a range between 4.35 ms and 17.4 ms. Note that, in a case where the angle of the beam width is provided, a maximum propagation distance can be obtained from the following equation (2).

$$\text{(Maximum propagation distance)} = \text{(altitude of satellite station device)} / \cos(\text{angle of beam width}) \quad (2)$$

Meanwhile, in a case where a cell radius is provided, the maximum propagation distance can be obtained from the following equation (3).

$$\text{(Maximum propagation distance)} = \sqrt{(\text{altitude of satellite station}^2 + \text{cell radius}^2)} \quad (3)$$

As an example, in a case where the altitude of the satellite station device 10 is from 500 km to 2,000 km, and the angle of the beam width is 40 degrees, the maximum propagation distance at each altitude is approximately 652.7 to 2610.8 km.

Therefore, when it comes to the low earth orbiting satellite cell using the parameters of the cell in FIG. 15, it is preferable to compensate for a propagation delay of 3.3 ms to 17.4 ms by the timing advance. Further, if the satellite is a geostationary earth orbiting satellite, the altitude becomes further higher and 35,786 km, and a propagation delay becomes larger, it is preferable to compensate for a larger propagation delay by the timing advance.

In a range of the timing advance value in the LTE, it has been impossible to sufficiently compensate for the propagation delay in satellite communication. Therefore, it is difficult to achieve synchronization regarding transmission from the earth terminal device to the satellite station device in satellite communication.

There have been things similar to those described above also regarding the CP. That is, in a range of a CP length in the LTE, it has been impossible to sufficiently compensate for a propagation delay in satellite communication. Therefore, it has been difficult to achieve symbol synchronization regarding transmission from the earth terminal device to the satellite station device in satellite communication, that is, it has been difficult to sufficiently remove inter-symbol interference and inter-subcarrier interference. There are problems similar to those described above also regarding filtering. That is, in a filter configuration in the LTE, it has been difficult to sufficiently remove inter-symbol interference and inter-subcarrier interference due to a synchronization loss in satellite communication.

Therefore, the present disclosure provides a mechanism which is capable of sufficiently compensating for a propagation delay in satellite communication.

3. FUNCTIONAL CONFIGURATION EXAMPLE

An example of functional configurations of the satellite station device 10 and the earth terminal device 40 will be described below with reference to FIG. 16 and FIG. 17.

(1) Functional Configuration of Satellite Station Device 10

Figure 16:
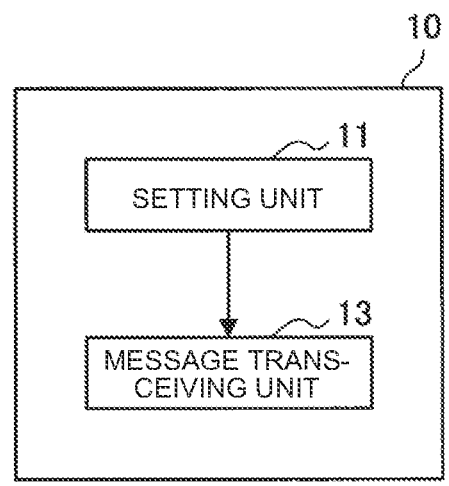
FIG. 16 is a diagram for explaining an example of a functional configuration of a satellite station device according to the present embodiment.

FIG. 16 is a diagram for explaining an example of a functional configuration of the satellite station device 10 according to the present embodiment. As illustrated in FIG. 16, the satellite station device 10 according to the present embodiment includes a setting unit 11 and a message transceiving unit 13. Note that each unit illustrated in FIG. 16 can be implemented at an arbitrary unit such as a higher layer processing unit 101 or a control unit 103 illustrated in FIG. 5. That is, in the present embodiment, it is assumed that the base station device 100 illustrated in FIG. 5 is configured as the satellite station device 10.

The setting unit 11 has a function of generating setting information regarding a transmission parameter to be used for transmission of a channel/signal from the earth terminal device 40 to the satellite station device 10. Specifically, the setting unit 11 generates satellite station device related information which will be described later. At least part of the satellite station device related information (for example, orbit information which will be described later) is set in advance or stored in the satellite station device 10. The setting unit 11 transmits the generated satellite station device related information to the earth terminal device 40.

The message transceiving unit 13 has a function of transmitting/receiving a message to/from the earth terminal device 40 on the basis of setting by the setting unit 11. Specifically, the message transceiving unit 13 receives a channel/signal transmitted from the earth terminal device 40 using a transmission parameter based on the above-described satellite station device related information. In this event, the message transceiving unit 13 receives the channel/signal using a reception parameter corresponding to the transmission parameter used by the earth terminal device 40. For example, the message transceiving unit 13 performs a reception process in accordance with setting of the timing advance and/or setting of the CP used by the earth terminal device 40.

(2) Functional Configuration of Earth Terminal Device 40

Figure 17:
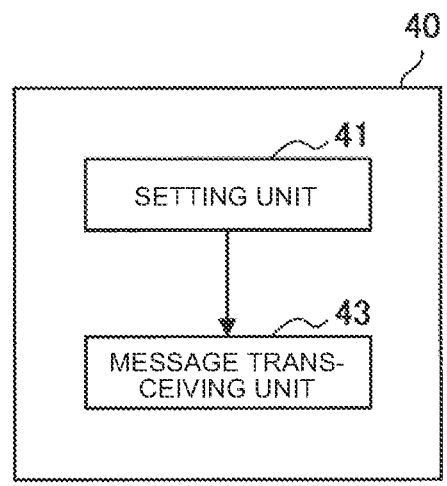
FIG. 17 is a diagram for explaining an example of a functional configuration of an earth terminal device according to the present embodiment.

FIG. 17 is a diagram for explaining an example of a functional configuration of the earth terminal device 40 according to the present embodiment. As illustrated in FIG. 17, the earth terminal device 40 according to the present embodiment includes a setting unit 41 and a message transceiving unit 43. Note that each unit illustrated in FIG. 17 can be implemented at an arbitrary unit such as the higher layer processing unit 201 and the control unit 203 illustrated in FIG. 6. That is, in the present embodiment, the terminal device 200 illustrated in FIG. 6 is configured as the earth terminal device 40.

The setting unit 41 has a function of setting a transmission parameter to be used for transmission of a channel/signal from the earth terminal device 40 to the satellite station device 10 on the basis of setting information received from the satellite station device 10. Specifically, the setting unit 41 performs setting of the timing advance and/or setting of the CP on the basis of the satellite station device related information.

The message transceiving unit 43 has a function of transmitting/receiving a message to/from the satellite station device 10 on the basis of setting by the setting unit 41. Specifically, the message transceiving unit 43 transmits a channel/signal to the satellite station device 10 using the set transmission parameter.

(3) Supplementary Note

Note that the channel/signal to be transmitted from the satellite station device 10 to the earth terminal device 40 may be a downlink signal (a downlink physical channel or a downlink physical signal) or may be backhaul traffic. In a similar manner, the channel/signal to be transmitted from the earth terminal device 40 to the satellite station device 10 may be an uplink signal (an uplink physical channel or an uplink physical signal) or may be backhaul traffic. In the following description, to simplify description, it is assumed that the channel/signal to be transmitted from the satellite station device 10 to the earth terminal device 40 is a downlink signal, and the channel/signal to be transmitted from the earth terminal device 40 to the satellite station device 10 is an uplink signal.

4. TECHNICAL FEATURES

<4.1. Basic Features>

The satellite station device 10 transmits to or notifies the earth terminal device 40 of information regarding a type of the satellite station device 10. Then, the earth terminal device 40 acquires the information regarding the type of the satellite station device 10 and controls a transmission timing of a signal to the earth terminal device 40 on the basis of information regarding a type of the earth terminal device 40. As a result, the earth terminal device 40 can transmit an uplink signal at a transmission timing based on the type of the satellite station device 10. Therefore, it is possible to sufficiently compensate for a propagation delay in satellite communication. In the following description, the information regarding the type of the satellite station device 10 will be also referred to as satellite station device related information.

(1) Satellite Station Device Related Information

Content of Satellite Station Device Related Information

The satellite station device related information can include information regarding altitude of the satellite station device 10. The altitude of the satellite station device 10 largely affects a propagation delay between the satellite station device 10 and the earth terminal device 40 within the cell. Therefore, by the earth terminal device 40 being notified of the information regarding the altitude of the satellite station device 10, the earth terminal device 40 can perform transmission timing control for compensating for a propagation delay which occurs in communication with the satellite station device 10.

The information regarding the altitude of the satellite station device 10 can be provided in various forms. For example, the information regarding the altitude of the satellite station device 10 may be provided as information indicating a range of the altitude at which the satellite station device 10 can be located. Further, the information regarding the altitude of the satellite station device 10 may be provided as information indicating the altitude of the satellite station device 10. For example, the information indicating the altitude of the satellite station device 10 can be provided as orbit information. The orbit information includes at least information indicating the altitude of the satellite station device 10. As an example, orbit information of the low earth orbiting satellite station device will be indicated in the following Table 1.

TABLE 1

Example of orbit information of low earth orbiting satellite station device

| | | | | |
|---|---|---|---|---|
| The number of orbits (Orbital Planes) | 32 | 8 | 5 | 6 |
| The number of satellite station devices (Satellites per plane) | 50 | 50 | 75 | 75 |
| Altitude (Altitude) | 1110 km | 1130 km | 1275 km | 1325 km |
| Angle (Inclination) | 53.8° | 74° | 81° | 70° |

Table 1 indicates the number of orbits, the number of satellite station devices, the altitude and the angle. The number of orbits in Table 1 indicates the number of orbits at the same altitude and at the same angle. The number of satellite station devices in Table 1 indicates the number of the satellite station devices 10 which orbit at the same altitude and at the same angle. The altitude in Table 1 indicates altitude of the orbit. However, in a case of an elliptical orbit, the orbit information includes information indicating change of the altitude. Here, the satellite station device 10 orbits on the orbit at speed in accordance with the altitude. That is, the altitude included in the orbit information can be said as information indicating moving speed of the satellite station device 10. Of course, the orbit information may separately include moving speed itself of the satellite station device 10 in addition to the altitude. The angle in Table 1 is an angle of the orbit with respect to latitude and longitude. That is, the angle included in the orbit information can be said as information indicating a moving direction of the satellite station device 10.

The satellite station device related information can include other various kinds of information. An example of the information will be described below. The information described below can be also regarded as information regarding the altitude of the satellite station device 10.

The satellite station device related information may include information indicating whether or not the cell is a satellite cell. This information may be information of one bit indicating whether or not the satellite station device 10 provides a satellite cell.

The satellite station device related information may include information indicating a type of the satellite station device 10. Such information is information indicating a ground station, a low earth orbiting satellite, a medium earth orbiting satellite, a high earth orbiting satellite, a geostationary earth orbiting satellite, or the like.

The satellite station device related information may include information indicating maximum coverage of the satellite station device 10 (for example, a cell radius, a beam width or a beam angle to be used at the satellite station).

The satellite station device related information may include information indicating a control method of a transmission timing (such as, for example, a range of a timing advance value which will be described later, an adjusted particle size, a replacement rule, and $TA_{satellite}$).

The satellite station device related information may include information indicating a control method of a CP length (such as, for example, a length of the CP).

The satellite station device related information may include information regarding filtering (such as, for example, information indicating a predetermined waveform and filter information (such as a filtering function and a roll-off value)).

Signaling

In a case of initial access (initial connection), the earth terminal device 40 within the cell is notified of the satellite station device related information from the satellite station device 10 using, for example, the system information (an MIB and/or an SIB). Note that it is preferable to use the SIB among the system information. The reason is that extension is easier with the SIB than with the MIB.

A case of dual connectivity will be described. A case will be assumed where an MgNB is a ground station device, and an SgNB is the satellite station device 10. In this case, the earth terminal device 40 is notified of the satellite station device related information from a macrocell (a PCell or a cell of the MgNB) using, for example, the system information or RRC signaling. Particularly, it is preferable that a notification of the satellite station device related information is made using dedicated RRC signaling.

A case of handover will be described. A case will be assumed where a source base station is a ground station device, and a target base station is the satellite station device 10. In this case, the earth terminal device 40 can be notified of the satellite station device related information from the source base station device using, for example, the system information or RRC signaling. Particularly, it is preferable that a notification of the satellite station device related information is made using dedicated RRC signaling. In addition, the earth terminal device 40 can be notified of the satellite station device related information from the source base station device using, for example, L1 signaling (handover command). Specifically, a notification of the satellite station device related information is made using a DCI included in a PDCCH order or a PDSCH including a handover command.

Frequency Band

The satellite station device related information may be associated with a predetermined band (a band, a center frequency). For example, in a case where communication is performed in a predetermined band which is used for low earth orbiting satellite communication, among a set of the satellite station device related information defined in advance, the satellite station device related information associated with the low earth orbiting satellite communication is set at the earth terminal device 40. For example, in a case where communication is performed in a predetermined band which is used for geostationary earth orbiting satellite communication, among the set of the satellite station device related information defined in advance, the satellite station device related information associated with the geostationary earth orbiting satellite communication is set at the earth terminal device 40.

(2) Transmission Timing Control

The earth terminal device 40 performs transmission timing control by switching setting between setting of a transmission timing which assumes communication with the ground station device (for example, in the LTE) and setting of a transmission timing which assumes communication with the satellite station device 10, in accordance with predetermined standards. For example, the earth terminal device 40 may switch setting to the setting of the transmission timing which assumes communication with the satellite station device 10 in a case where the earth terminal device 40 receives the satellite station device related information and recognizes that satellite communication is performed. Further, in a case of supporting satellite communication, the earth terminal device 40 may switch the setting to the setting of the transmission timing which assumes communication with the satellite station device 10. Whether or not to support satellite communication may be associated with a supporting frequency band. For example, the earth terminal device 40 performs setting of the transmission timing which assumes communication with the ground station device in a frequency band which does not support satellite communication, and performs setting of the transmission timing which assumes communication with the satellite station device 10 in a frequency band which supports satellite communication.

The transmission timing control can include switching of setting of timing advance. The earth terminal device 40 sets a timing advance value with which a propagation delay in accordance with the type of the satellite station device 10 can be compensated for. By this means, also in a case where satellite communication is performed, the earth terminal device 40 can achieve synchronization regarding uplink communication.

The transmission timing control can include switching of setting of the CP. The earth terminal device 40 sets a CP length with which a propagation delay in accordance with the type of the satellite station device 10 can be compensated for. By this means, also in a case where satellite communication is performed, it is possible to achieve symbol synchronization by sufficiently removing inter-symbol interference and inter-subcarrier interference regarding uplink transmission.

The transmission timing control can include switching of filtering. The earth terminal device 40 sets filtering with which a propagation delay in accordance with the type of the satellite station device 10 can be compensated for. By this means, also in a case where satellite communication is performed, it is possible to achieve symbol synchronization by sufficiently removing inter-symbol interference and inter-subcarrier interference regarding uplink transmission.

Here, only one of switching of the setting of the timing advance value, switching of the setting of the CP and switching of the filtering may be executed, or switching may be executed in combination. In a case where switching is executed in combination, compensation of a propagation delay may be shared by the timing advance value and the CP length. That is, a compensation amount of the propagation delay may be divided by the timing advance value and the CP length. For example, the timing advance value is set at a value which enables compensation (that is, absorption) for part of the propagation delay relating to communication with the satellite station device 10, and the CP length is set at a value which enables compensation (that is, absorption) for the remaining part. Further, for example, the timing advance value is set at a value which enables compensation (that is, absorption) for part of the propagation delay relating to communication with the satellite station device 10, and filtering is set so as to be able to compensate for (that is, absorb) the remaining part. By this means, because it is possible to prevent the propagation delay from being excessively compensated for, it is possible to improve transmission efficiency.

Procedure

Figure 18:
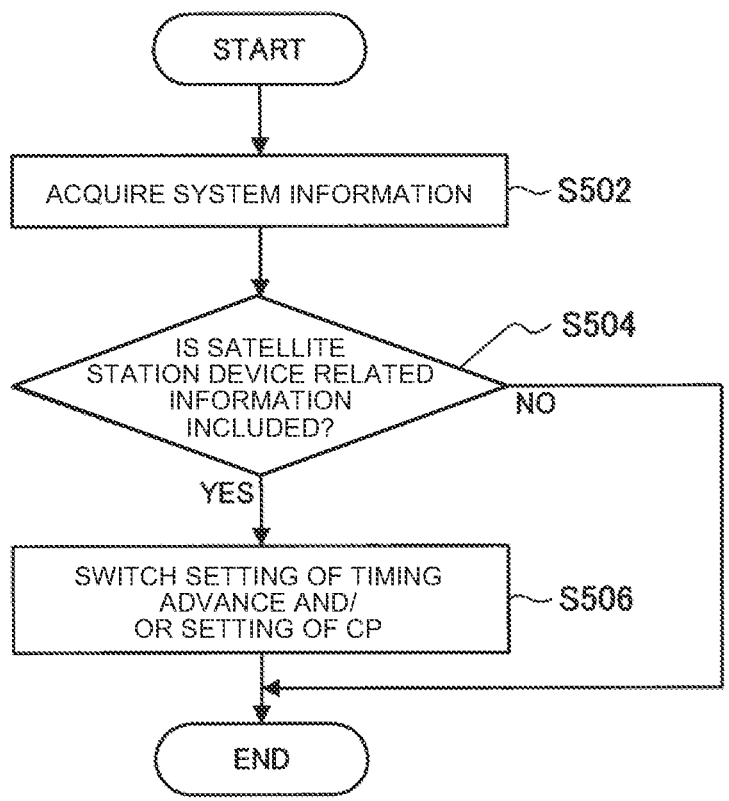
FIG. 18 is a flowchart illustrating an example of a procedure for transmission timing control to be executed by the earth terminal device according to the present embodiment.

An example of a procedure for transmission timing control according to the present embodiment will be described below with reference to FIG. 18. FIG. 18 is a flowchart illustrating an example of the procedure for transmission timing control to be executed by the earth terminal device 40 according to the present embodiment. It is assumed as a premise in the present flow that the earth terminal device 40 performs setting of the timing advance and setting of the CP which assume communication with the ground station device (for example, in the LTE).

As illustrated in FIG. 18, first, the earth terminal device 40 acquires the system information (the MIB and/or the SIB) (Step S502). Then, the earth terminal device 40 determines whether or not the satellite station device related information is included in the system information (Step S504). In a case where the satellite station device related information is included (Step S504: Yes), the earth terminal device 40 switches setting of the timing advance and/or setting of the CP on the basis of the satellite station device related information (Step S506). Meanwhile, in a case where the satellite station device related information is not included (Step S504: No), the earth terminal device 40 continuously uses setting of the timing advance and setting of the CP which assume communication with the ground station device (for example, in the LTE).

<4.2. Extension of Timing Advance>

Switching of setting of the timing advance will be described below.

<4.2.1. Switching of Range>

In the present section, a technology for switching a range of the timing advance value to support satellite communication will be described. The range of the timing advance value is a range in which the timing advance value can be set. Note that the timing advance value is calculated or determined by the satellite station device 10. The earth terminal device 40 switches the range of the timing advance value so that the timing advance value calculated or determined by the satellite station device 10 can be set.

The range of the timing advance value is switched on the basis of a maximum propagation delay in accordance with the type of the satellite station device 10. In detail, a maximum value of the range of the timing advance value is set at a value with which it is possible to compensate for (that is, absorb) the maximum propagation delay in accordance with the type of the satellite station device 10. That is, the maximum value of the range of the timing advance value is set at a value which is equal to or greater than the maximum propagation delay in accordance with the type of the satellite station device 10. By this means, even in a case where the maximum propagation delay which is assumed in accordance with the type of the satellite station device 10 occurs, the earth terminal device 40 can set the timing advance value with which synchronization regarding uplink transmission can be achieved.

Further, the range of the timing advance value may be switched on the basis of a minimum propagation delay in accordance with the type of the satellite station device 10. In detail, a minimum value of the range of the timing advance value may be set at a value with which it is possible to compensate for (that is, absorb) the minimum propagation delay in accordance with the type of the satellite station device 10. That is, the minimum value of the range of the timing advance value is set at a value equal to or less than the minimum propagation delay in accordance with the type of the satellite station device 10. By this means, even in a case where the minimum propagation delay which is assumed in accordance with the type of the satellite station device 10 occurs, the earth terminal device 40 can set the timing advance value with which synchronization regarding uplink transmission can be achieved.

The maximum propagation delay in accordance with the type of the satellite station device 10 is a propagation delay in a case where the satellite station device 10 is located at the highest altitude for the type of the satellite station device, and the earth terminal device 40 is located at a cell edge of the satellite station device 10. For example, the maximum propagation delay in a case where the satellite station device 10 is a low earth orbiting satellite is a propagation delay in a case where the satellite station device 10 is located at altitude of 2,000 km, and the earth terminal device 40 is located at a cell edge. In a case of the low earth orbiting satellite cell in FIG. 15, the maximum propagation delay is 17.4 ms.

The minimum propagation delay in accordance with the type of the satellite station device 10 is a propagation delay in a case where the satellite station device 10 is located at the lowest altitude for the type of the satellite station device, and the earth terminal device 40 is located immediately below (that is, on a vertical line) of the satellite station device 10. For example, the minimum propagation delay in a case where the satellite station device 10 is a low earth orbiting satellite is a propagation delay in a case where the satellite station device 10 is located at altitude of 500 km, and the earth terminal device 40 is located immediately below the satellite station device 10. The propagation delay in this case is 3.3 ms.

A specific example of switching of the range of the timing advance value will be described below.

First Example

The range of the timing advance value may be switched by switching of a maximum value of the timing advance value. The maximum value of the timing advance value is switched to a value with which it is possible to compensate for the maximum propagation delay in accordance with the type of the satellite station device 10. For example, the maximum value of the timing advance value is extended to X times in accordance with the altitude of the satellite station device 10. That is, the range of the timing advance value is extended to X times (0≤TA≤X×20512×Ts, that is, 0 ms≤TA≤X×0.67 ms). For example, in a case of the low earth orbiting satellite cell in FIG. 15, X=26.

In the first example, the satellite station device related information may include information indicating the above-described X. Alternatively, the above-described X may be fixedly set at the earth terminal device 40. The earth terminal device 40 which supports satellite communication extends the range of the timing advance value to X times in a case where satellite communication is performed. An area for storing the timing advance value in RAR is preferably extended in accordance with the above-described extension of the range of the timing advance value. For example, the area is preferably extended (that is, added) by an amount corresponding to 5 bits.

Second Example

The range of the timing advance value may be switched by switching of an adjusted particle size of the timing advance value. The adjusted particle size of the timing advance value is switched to a size at which it is possible to compensate for the maximum propagation delay in accordance with the type of the satellite station device 10. In the LTE, the timing advance value is adjusted at a particle size of 16 times of an adjusted particle size Ts in the above-described equation (1) (that is, 16×Ts). This adjusted particle size is extended to X times (that is, X×16×Ts) in accordance with the altitude of the satellite station device 10.

In a second example, the satellite station device related information may include information indicating the above-described X. Alternatively, the above-described X may be fixedly set at the earth terminal device 40. The earth terminal device 40 which supports satellite communication extends the adjusted particle size of the timing advance value to X times in a case where satellite communication is performed.

Third Example

Switching of the range of the timing advance value may be realized in a pseudo manner by the range of the timing advance value being replaced with the range in accordance with the altitude of the satellite station device 10. In this case, the earth terminal device 40 replaces the minimum value and the maximum value of the range of the timing advance value with values respectively with which it is possible to compensate for the minimum propagation delay and the maximum propagation delay in accordance with the type of the satellite station device 10. For example, in a case where the satellite station device is a low earth orbiting satellite, and an angle of the beam width is 40 degrees, the minimum value of the range of the timing advance value can be replaced with a value with which it is possible to compensate for the minimum propagation delay of 3.3 ms. Further, in a case where the satellite station device is a low earth orbiting satellite, and an angle of the beam width is 40 degrees, the maximum value of the range of the timing advance value can be replaced with a value with which it is possible to compensate for the maximum propagation delay of 17.4 ms. That is, in a case where the satellite station device is a low earth orbiting satellite, and an angle of the beam width is 40 degrees, the timing advance value can be replaced with a value with which it is possible to compensate for a propagation delay of 3.3 ms to 17.4 ms (101376×Ts≤TA≤535530×Ts, that is, 3.3 ms≤TA≤17.4 ms).

In the third example, the satellite station device related information may include information indicating whether or not the value is replaced. Further, the satellite station device related information may include a replacement rule including the minimum value and the maximum value of the range of the timing advance value. Alternatively, the above-described replacement rule may be fixedly set at the earth terminal device 40. The earth terminal device 40 which supports satellite communication applies the replacement rule in a case where satellite communication is performed.

A notification of the timing advance value using the RAR is made in an existing range (0≤TA≤20512×Ts, that is, 0 ms≤TA≤0.67 ms). The earth terminal device 40 acquires the timing advance value which is appropriate for satellite communication by replacing the timing advance value included in the RAR by mapping the timing advance value to a range of the timing advance value extended in a pseudo manner (101376×Ts≤TA≤535530×Ts, that is, 3.3 ms≤TA≤17.4 ms). For example, in the RAR, in a case where a notification of the timing advance value at a minimum value of 0 is made, the earth terminal device 40 sets a minimum value of 101376×Ts (that is, 3.3 ms) for the timing advance value by mapping 0 in the existing range to the extended range of the timing advance value.

A specific example of switching of the range of the timing advance value has been described above. Because the maximum value of the range of the timing advance value becomes a value corresponding to the maximum propagation delay in either case, it becomes possible to sufficiently compensate for a propagation delay in satellite communication.

Procedure

Figure 19:
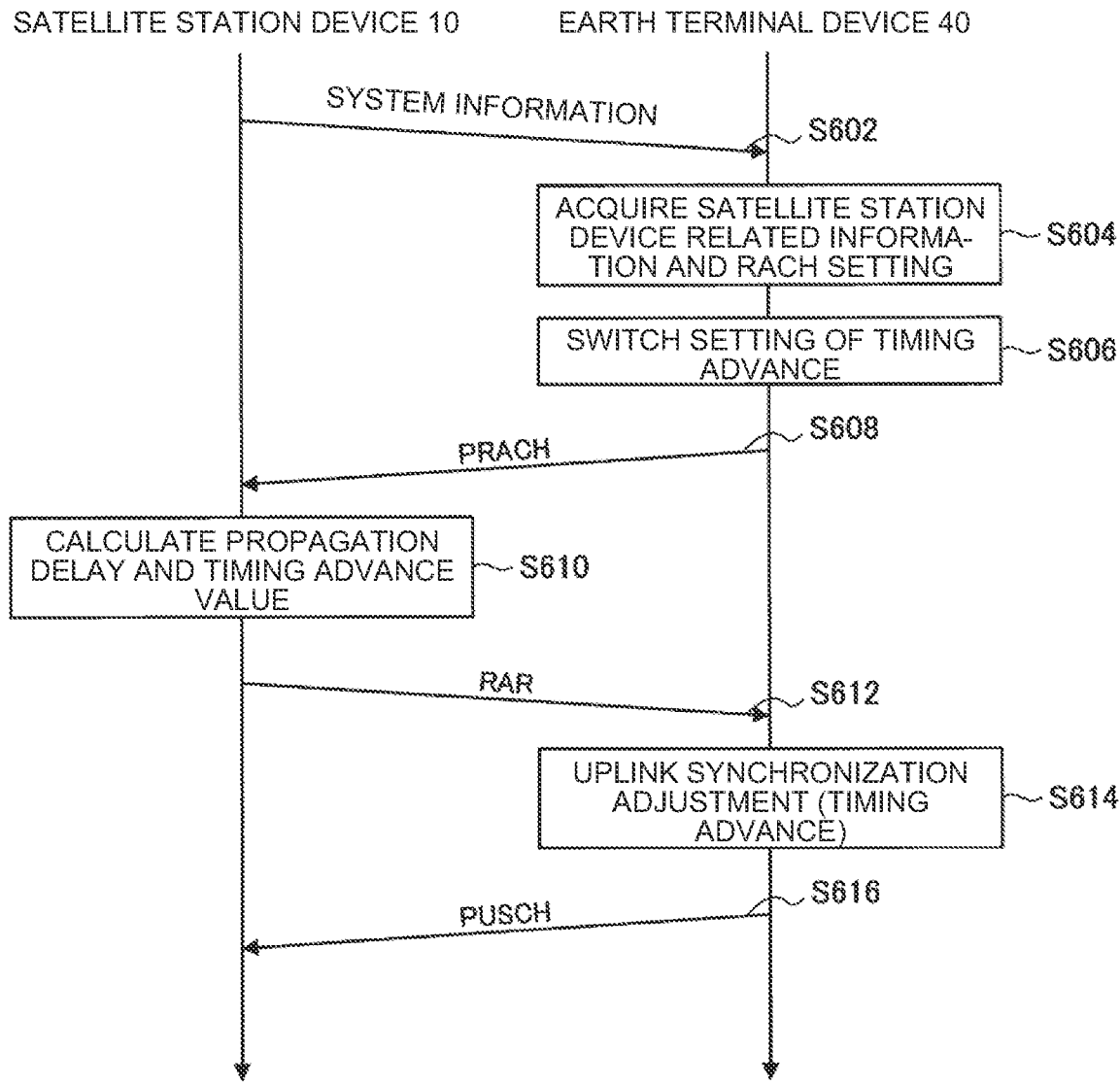
FIG. 19 is a sequence diagram illustrating an example of flow of a synchronization adjustment procedure including switching of a range of a timing advance value, to be executed in a system according to the present embodiment.

An example of a synchronization adjustment procedure including the above-described switching of the range of the timing advance value will be described below with reference to FIG. 19. FIG. 19 is a sequence diagram illustrating an example of flow of the synchronization adjustment procedure including switching of the range of the timing advance value to be executed in the system 1 according to the present embodiment. As illustrated in FIG. 19, the satellite station device 10 and the earth terminal device 40 are involved with the present sequence. In the present sequence, processes corresponding to Steps S402 and S404 illustrated in FIG. 12 are omitted. As a premise of the present sequence, it is assumed that the earth terminal device 40 performs setting of the timing advance which assumes communication with the ground station device (for example, in the LTE).

First, the satellite station device 10 transmits the system information (the MIB and the SIB) including the satellite station device related information and RACH setting to the earth terminal device 40 (Step S602). Next, the earth terminal device 40 receives the system information and acquires the satellite station device related information and the RACH setting from the system information (Step S604). Then, the earth terminal device 40 switches the setting of the timing advance on the basis of the satellite station device related information (Step S606). In detail, the earth terminal device 40 switches the range of the timing advance value in accordance with the type of the satellite station device 10 included in the satellite station device related information.

Then, the earth terminal device 40 transmits a PRACH on the basis of a frame timing synchronized using a downlink synchronization signal (Step S608). The satellite station device 10 calculates the propagation delay and the timing advance value on the basis of a difference between a reception timing of the PRACH and a timing of an uplink frame of the satellite station device 10 (Step S610). Then, the satellite station device 10 transmits a random access response (RAR) including the timing advance value to the earth terminal device 40 (Step S612). Next, the earth terminal device 40 acquires the timing advance value from the received RAR and adjusts the uplink transmission timing so as to be advanced (Step S614). Here, because the earth terminal device 40 switches the range of the timing advance value in advance in Step S606 in accordance with the type of the satellite station device 10, it is possible to set the timing advance value with which it is possible to sufficiently compensate for a propagation delay with the satellite station device 10. Thereafter, the earth terminal device 40 transmits a PUSCH at the uplink transmission timing adjusted in Step S614 (Step S616).

<4.2.2. Consideration of Offset Due to Altitude of Satellite Station Device>

In the present section, a technology for switching the timing advance value by switching whether or not to consider an offset due to the altitude of the satellite station device to support satellite communication will be described.

Basic Principle

Figure 20:
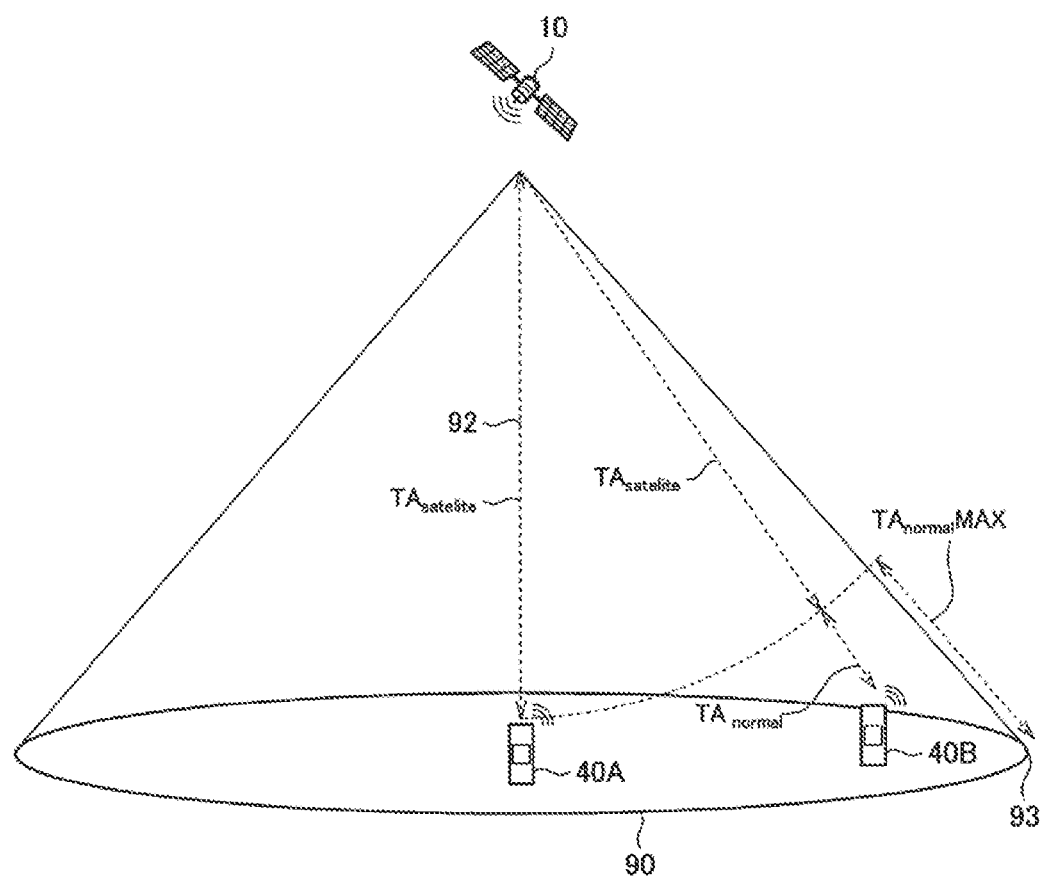
FIG. 20 is a diagram for explaining an example of a calculation method of the timing advance value according to the present embodiment.

FIG. 20 is a diagram for explaining an example of a calculation method of the timing advance value according to the present embodiment. As illustrated in FIG. 20, an earth terminal device 40A is located immediately below the satellite station device 10, and an earth terminal device 40B is located at a position away from a position immediately below the satellite station device 10 within the cell 90 of the satellite station device 10. It is assumed that the satellite station device 10 is a low earth orbiting satellite station device. A propagation delay between the satellite station device 10 and the earth terminal device 40 within the cell 90 of the satellite station device 10 includes at least a propagation delay corresponding to the altitude of the satellite station device 10.

Therefore, the earth terminal device 40 calculates the timing advance value by adding a second value based on the position of the earth terminal device 40 in a cell provided by the satellite station device 10, to a first value based on the type of the satellite station device 10. The first value is a value corresponding to the type of the satellite station device 10, and, in more detail, an offset corresponding to the altitude 92 of the satellite station device 10. The first value corresponds to $TA_{satellite}$ in FIG. 20. It is possible to compensate for (that is, absorb) a propagation delay due to the altitude of the satellite station device 10 with the first value. The second value is a value based on the position of the earth terminal device 40 in the cell provided by the satellite station device 10, and, in more detail, a value corresponding to a difference in the propagation delay between earth terminal devices 40 within the cell. The second value corresponds to $TA_{normal}$ in FIG. 20. It is possible to compensate for (that is, absorb) a difference in the propagation delay between the earth terminal devices 40 within the cell with the second value. As described above, the earth terminal device 40 calculates the timing advance value using the following equation (4).

$$TA = TA_{satellite} + TA_{normal} \qquad (4)$$

Because the earth terminal device 40A illustrated in FIG. 20 is located immediately below the satellite station device 10, $TA = TA_{satellite}$, and the earth terminal device 40A performs uplink transmission earlier by an amount corresponding to $TA_{satellite}$. Meanwhile, because the earth terminal device 40B illustrated in FIG. 20 is located away from a position immediately below the satellite station device 10, $TA = TA_{satellite} + TA_{normal}$, and the earth terminal device 40B performs uplink transmission earlier by an amount corresponding to $TA_{satellite} + TA_{normal}$. Because a difference in the propagation delay between the earth terminal device 40A and the earth terminal device 40B is absorbed by $TA_{normal}$, uplink signals respectively transmitted from the earth terminal devices 40A and 40B are received by the satellite station device 10 at the same timing. Further, because a propagation delay due to the altitude of the satellite station device 10 is absorbed by $TA_{satellite}$, uplink signals respectively transmitted from the earth terminal devices 40A and 40B are received by the satellite station device 10 at the same timing as those of the respective downlink signals. In this manner, as a result of the timing advance value being calculated from a sum of the first value and the second value, it is possible to compensate for a propagation delay due to the altitude of the satellite station device 10 as well as a difference in the propagation delay between the earth terminal devices 40.

Note that, concerning communication with the ground station device, the timing advance value is calculated on the basis of only the second value.

Range $TA_{satellite}$ is adjusted at an adjusted particle size rougher (larger) than an adjusted particle size (16×Ts) of $TA_{normal}$.

The range of $TA_{normal}$ is extended so as to support coverage of the satellite station device 10 (for example, a radius of 1,000 km if the satellite station device is a low earth orbiting satellite base station). The range of $TA_{normal}$ is calculated so as to cover a portion from a central portion to an edge on the basis of the altitude of the satellite station device 10. As illustrated in FIG. 20, a maximum value of the range of the $TA_{normal}$ ($TA_{normalMAX}$) corresponds to a distance obtained by subtracting the altitude 92 of the satellite station device 10 from the distance between the satellite station device 10 and an edge 93 of the cell 90 provided by the satellite station device 10. That is, the maximum value of the range of $TA_{normal}$ ($TA_{normalMAX}$) corresponds to a distance obtained by subtracting the altitude of the satellite station device 10 from a maximum propagation distance within the cell of the satellite station device 10. The maximum propagation distance is calculated from the above-described equation (2) or equation (3). Meanwhile, a minimum value of the range of $TA_{normal}$ corresponds to a distance obtained by subtracting the altitude of the satellite station device 10 from a minimum propagation distance within the cell of the satellite station device 10. Because the minimum propagation distance within the cell of the satellite station device 10 is equal to the altitude of the satellite station device 10, the minimum value of the range of $TA_{normal}$ is 0.

The range of $TA_{normal}$ may be calculated by the earth terminal device 40 or may be calculated by the satellite station device 10. In a case of being calculated by the earth terminal device 40, the satellite station device related information includes information for calculating the range. For example, the satellite station device related information may include the altitude of the satellite station device 10 and the angle of the beam width, in which case, the earth terminal device 40 calculates the maximum propagation distance using the above-described equation (2) and calculates the maximum propagation delay on the basis of the maximum propagation distance. Further, the satellite station device related information may include the altitude of the satellite station device 10 and the cell radius, in which case, the earth terminal device 40 calculates the maximum propagation distance using the above-described equation (3) and calculates the maximum propagation delay on the basis of the maximum propagation distance.

In place of calculation of the range of $TA_{normal}$, the earth terminal device 40 may use a range corresponding to the altitude of the satellite station device 10. For example, the earth terminal device 40 stores ranges of $TA_{normal}$ in accordance with candidates for the altitude of the satellite station device 10 in advance and selects and uses a range in accordance with the altitude of the satellite station device 10.

Signaling $TA_{satellite}$ is quasi-statically determined, and $TA_{normal}$ is dynamically determined.

$TA_{satellite}$ is calculated on the basis of information indicating the type of the satellite station device 10, in more detail, on the basis of the altitude. The earth terminal device 40 within the cell is informed of $TA_{satellite}$ from the satellite station device 10 using, for example, the system information (the MIB and/or the SIB).

The earth terminal device 40 transmits a PRACH to the satellite station device 10 at a transmission timing based on $TA_{satellite}$. In more detail, the earth terminal device 40 transmits the PRACH to the satellite station device 10 earlier by an amount corresponding to $TA_{satellite}$. By this means, the satellite station device 10 receives the PRACH for which a propagation delay occurs in accordance with the position of the earth terminal device 40 within the cell. Therefore, the satellite station device 10 can calculate the timing advance value $TA_{normal}$ for compensating for the difference in the propagation delay while excluding influence of the propagation delay due to the altitude of the satellite station device 10.

The satellite station device 10 calculates the timing advance value $TA_{normal}$ for compensating for the difference in the propagation delay on the basis of the reception timing of the PRACH from the earth terminal device 40. In detail, the satellite station device 10 recognizes a propagation delay in accordance with the position of the earth terminal device 40 within the cell on the basis of the reception timing of the PRACH and calculates the timing advance value $TA_{normal}$ for compensating for the recognized propagation delay. Then, the satellite station device 10 transmits the RAR including the calculated timing advance value $TA_{normal}$ for compensating for the difference in the propagation delay, to the earth terminal device 40. In this manner, the earth terminal device 40 acquires $TA_{normal}$ from the satellite station device 10. Then, the earth terminal device 40 transmits an uplink physical channel/signal such as a PUSCH, a PUCCH and an SRS using a value obtained by adding $TA_{satellite}$ and $TA_{normal}$ as the timing advance value.

Procedure

Figure 21:
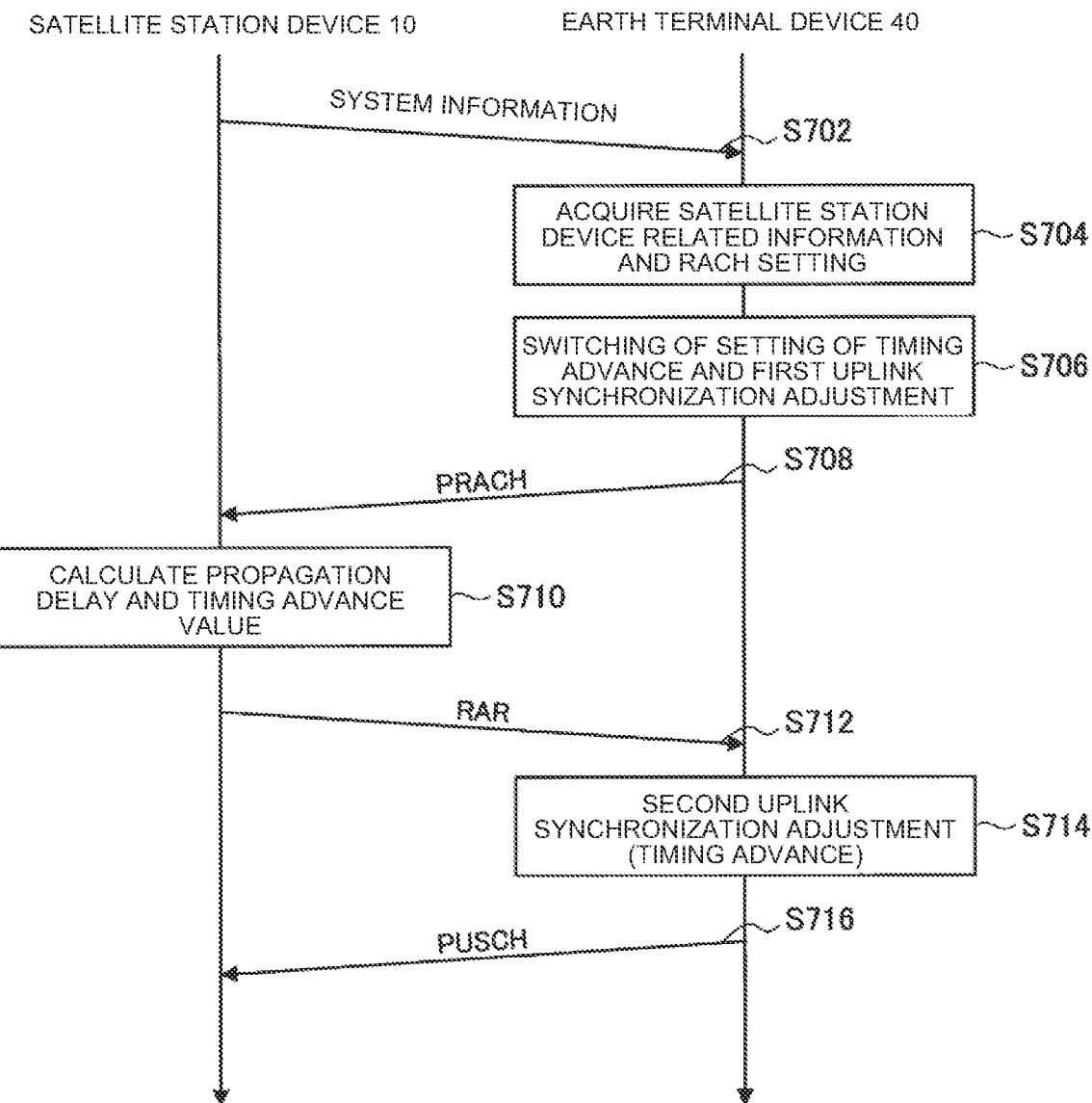
FIG. 21 is a sequence diagram illustrating an example of flow of a synchronization adjustment procedure including consideration of an offset due to altitude of the satellite station device, to be executed in the system according to the present embodiment.

An example of a synchronization adjustment procedure including consideration of an offset due to the altitude of the satellite station device 10 described above will be described below with reference to FIG. 21. FIG. 21 is a sequence diagram illustrating an example of flow of the synchronization adjustment procedure including consideration of an offset due to the altitude of the satellite station device 10 to be executed in the system 1 according to the present embodiment. As illustrated in FIG. 21, the satellite station device 10 and the earth terminal device 40 are involved with the present sequence. In the present sequence, processes corresponding to Steps S402 and S404 illustrated in FIG. 12 are omitted. As a premise of the present sequence, it is assumed that the earth terminal device 40 performs setting of the timing advance which assumes communication with the ground station device (for example, in the LTE).

First, the satellite station device 10 transmits the system information (the MIB and the SIB) including the satellite station device related information and RACH setting to the earth terminal device 40 (Step S702). Next, the earth terminal device 40 receives the system information and acquires the satellite station device related information and the RACH setting from the system information (Step S704). Then, the earth terminal device 40 switches the setting of the timing advance on the basis of the satellite station device related information and performs first uplink synchronization adjustment (Step S706). In detail, the earth terminal device 40 switches the range of the timing advance value ($TA_{normal}$) for compensating for the difference in the propagation delay in accordance with the type of the satellite station device 10 included in the satellite station device related information. Further, the earth terminal device 40 sets an offset $TA_{satellite}$ due to the altitude of the satellite station device 10 in accordance with the type of the satellite station device 10 included in the satellite station device related information.

Next, the earth terminal device 40 transmits a PRACH to the satellite station device 10 at a frame timing synchronized using a downlink synchronization signal and at a transmission timing based on the offset $TA_{satellite}$ due to the altitude of the satellite station device 10 (step S708). The satellite station device 10 calculates a propagation delay and a timing advance value on the basis of a difference between the reception timing of the PRACH and a timing of an uplink frame of the satellite station device 10 (step S710). The timing advance value calculated here is a timing advance value $TA_{normal}$ for compensating for the difference in the propagation delay within the cell. The satellite station device 10 then transmits a random access response (RAR) including the timing advance value $TA_{normal}$ to the earth terminal device 40 (step S712). Then, the earth terminal device 40 acquires the timing advance value $TA_{normal}$ from the received RAR and performs second uplink synchronization adjustment (step S714). In detail, the earth terminal device 40 sets a value obtained by adding $TA_{satellite}$ to $TA_{normal}$ as the timing advance value to be used for uplink transmission. Here, the earth terminal device 40 switches the range of the timing advance value ($TA_{normal}$) for compensating for the difference in the propagation delay in step S706 in advance in accordance with the type of the satellite station device 10. Therefore, the earth terminal device 40 can set the timing advance value with which it is possible to sufficiently compensate for the propagation delay between the earth terminal device 40 and the satellite station device 10. Thereafter, the earth terminal device 40 transmits a PUSCH at the uplink transmission timing adjusted in step S714 (step S716).

<4.2.3. Consideration of Only Offset Due to Altitude of Satellite Station Device>

In the present section, setting of the timing advance in a case where only an offset due to the altitude of the satellite station device 10 is taken into consideration will be described.

In a case where it is possible to compensate for the difference in the propagation delay within the cell through extension of the CP length or application of filtering, necessity of compensating for the difference in the propagation delay through a RACH procedure is reduced.

Therefore, the earth terminal device 40 uses a predetermined value as the timing advance value. The predetermined value described here is a value based on the propagation delay due to the altitude of the satellite station device 10. That is, the predetermined value described here is a value in accordance with the type or the altitude of the satellite station device 10. By this means, the earth terminal device 40 can achieve synchronization regarding uplink transmission.

Because the difference in the propagation delay within the cell is not compensated for, the earth terminal device 40 does not have to transmit a PRACH. By this means, communication load and processing load of the satellite station device 10 and the earth terminal device 40 are reduced.

Figure 22:
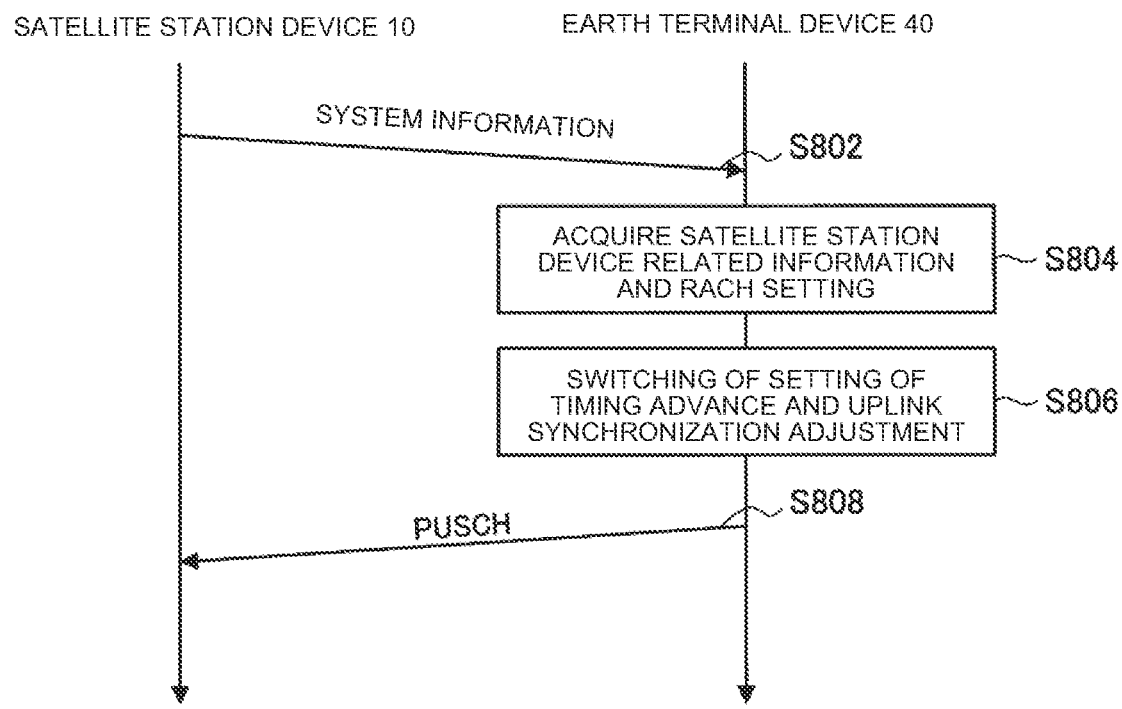
FIG. 22 is a sequence diagram illustrating an example of flow of a synchronization adjustment procedure in a case where only an offset due to altitude of the satellite station device is taken into consideration, to be executed in the system according to the present embodiment.

An example of a synchronization adjustment procedure in a case where an offset due to the altitude of the satellite station device 10 described above is only considered will be described below with reference to FIG. 22. FIG. 22 is a sequence diagram illustrating an example of flow of the synchronization adjustment procedure in a case where an offset due to the altitude of the satellite station device 10 to be executed in the system 1 according to the present embodiment is only considered. As illustrated in FIG. 22, the satellite station device 10 and the earth terminal device 40 are involved with the present sequence. In the present sequence, processes corresponding to Steps S402 and S404 illustrated in FIG. 12 are omitted. As a premise of the present sequence, it is assumed that the earth terminal device 40 performs setting of the timing advance which assumes communication with the ground station device (for example, in the LTE).

First, the satellite station device 10 transmits the system information (the MIB and the SIB) including the satellite station device related information and RACH setting to the earth terminal device 40 (step S802). Here, the satellite station device related information includes information indicating the type of the satellite station device 10. Next, the earth terminal device 40 receives the system information and acquires the satellite station device related information and the RACH setting from the system information (step S804). Then, the earth terminal device 40 switches setting of the timing advance on the basis of the satellite station device related information and performs uplink synchronization adjustment (step S806). In detail, the earth terminal device 40 sets a predetermined value as the timing advance value. Thereafter, the earth terminal device 40 transmits a PUSCH at the uplink transmission timing adjusted in step S806 (step S808).

<4.3. Extension of CP>

Switching of CP setting will be described below.

The earth terminal device 40 controls the CP length in accordance with the type of the satellite station device 10. The CP length of the physical channel to be transmitted from the earth terminal device 40 to the satellite station device 10 is set on the basis of the maximum propagation delay in accordance with the type of the satellite station device 10. In detail, the CP length is set at a value with which it is possible to compensate for (that is, absorb) the maximum propagation delay in accordance with the type of the satellite station device 10. That is, the CP length is set at a value equal to or greater than the maximum propagation delay in accordance with the type of the satellite station device 10. By this means, even in a case where the maximum propagation delay which is assumed in accordance with the type of the satellite station device 10 occurs, it is possible to achieve symbol synchronization by sufficiently removing inter-symbol interference and inter-subcarrier interference regarding uplink transmission.

Because, in satellite communication, the altitude of the satellite station device 10 is high, and the cell is large, the maximum propagation delay is larger than the maximum propagation delay which is assumed for the ground station device. Therefore, the earth terminal device 40 sets the CP length longer in a case where satellite communication is performed than in a case where communication is performed with the ground station device. Setting a longer CP length may be regarded as setting a longer symbol length.

A first method for making a symbol length longer is a method in which an FFT size is changed. For example, the earth terminal device 40 may make the symbol length longer by narrowing a subcarrier interval and/or changing a sampling period.

A second method for making a symbol length longer is a method in which symbols are repeatedly connected without the FFT size being changed. The earth terminal device 40 may make the symbol length longer by repeatedly connecting symbols.

<4.4. Switching of Filtering>

Switching of a filter configuration will be described below.

The earth terminal device 40 controls a filter configuration in accordance with the type of the satellite station device 10. As a filter of the physical channel to be transmitted from the earth terminal device 40 to the satellite station device 10, a filter different from a filter of a physical channel to be transmitted to the ground station is set. By this means, even in a case where a propagation delay which is assumed in accordance with the type of the satellite station device 10 occurs, it is possible to sufficiently remove inter-symbol interference and inter-subcarrier interference regarding uplink transmission due to a synchronization loss.

Filtering includes a waveform. The filtering which supports satellite communication is, for example, a filter bank.

The waveform which supports satellite communication is, for example, a filter bank multi-carrier (FBMC).

5. MODIFIED EXAMPLES

While, in the above description, the base station device 100 is configured as the satellite station device 10, and the terminal device 200 is configured as the earth terminal device 40 which supports a non-terrestrial network, the present technology is not limited to such an example. For example, the base station device 100 may be configured as the earth terminal device 40. In this case, the earth terminal device 40 provides wireless communication service to other earth terminal devices (for example, UEs), and transmits/receives backhaul traffic to/from the satellite station device 10.

Control of transmission parameters for backhaul traffic to be transmitted from the base station device 100 configured as the earth terminal device 40 to the satellite station device 10 is performed in a similar manner to control of transmission parameters for uplink signals described above. Specifically, setting of the timing advance and/or setting of the CP is switched on the basis of the satellite station device related information.

6. APPLICATION EXAMPLES

The technology according to the present disclosure can be applied to various products.

For example, the earth terminal device 40 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the earth terminal device 40 may be realized as another type of base station such as a NodeB or a base transceiver station (BTS). The earth terminal device 40 may include a main entity (also referred to as a base station device) that controls wireless communication and one or more remote radio heads (RRHs) disposed at different locations from the main entity. Further, various types of terminals to be described below may operate as the earth terminal device 40 by performing a base station function temporarily or semi-permanently.

Further, for example, the earth terminal device 40 may be realized as a mobile terminal such as a smartphone, a tablet personal computer (PC), a notebook PC, a portable game terminal, a portable/dongle mobile router or a digital camera, or an in-vehicle terminal such as a car navigation apparatus. Further, the earth terminal device 40 may be realized as a terminal that performs machine to machine (M2M) communication (also referred to as a machine type communication (MTC) terminal). Moreover, the earth terminal device 40 may be a wireless communication module mounted on the terminal (for example, an integrated circuit module configured on one die).

<6.1. Application Examples for Base Station Device>

First Application Example

Figure 23:
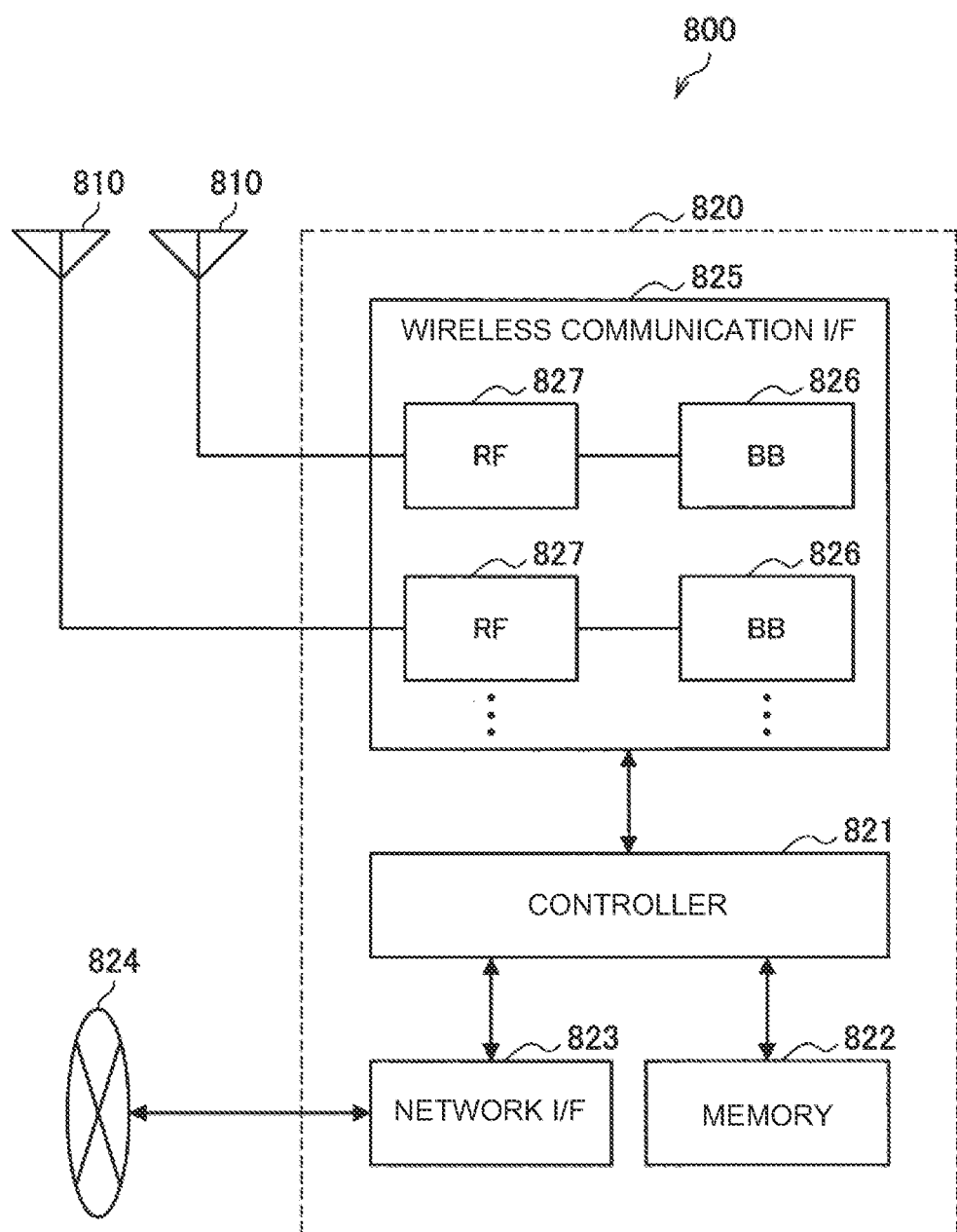
FIG. 23 is a block diagram illustrating a first example of a schematic configuration of an eNB.

FIG. 23 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 23, and the plurality of antennas 810 may, for example, correspond to a plurality of frequency bands used by the eNB 800. It should be noted that while FIG. 23 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 23, and the plurality of BB processors 826 may, for example, correspond to a plurality of frequency bands used by the eNB 800. Further, the wireless communication interface 825 may also include a plurality of the RF circuits 827, as illustrated in FIG. 23, and the plurality of RF circuits 827 may, for example, correspond to a plurality of antenna elements. Note that FIG. 23 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 23, the setting unit 41 and/or the message transceiving unit 43 described with reference to FIG. 17 may be implemented by the wireless communication interface 825 (such as the BB processor 826 and/or the RF circuit 827), the controller 821 and/or the network interface 823. For example, the wireless communication interface 825, the controller 821 and/or the network interface 823 acquire setting information from the satellite station device 10 and transmit channels/signals to the satellite station device 10 using transmission parameters in accordance with the setting information. For example, a processor included in the wireless communication interface 825 may implement the functions for performing such operation. The eNB 800, the base station device 820, or the module may be provided as a device that performs such operation. In addition, it is possible to provide a program that causes a processor to perform the above-described operation. In addition, it is possible to provide a readable recording medium having the above-described program recorded thereon.

Second Application Example

Figure 24:
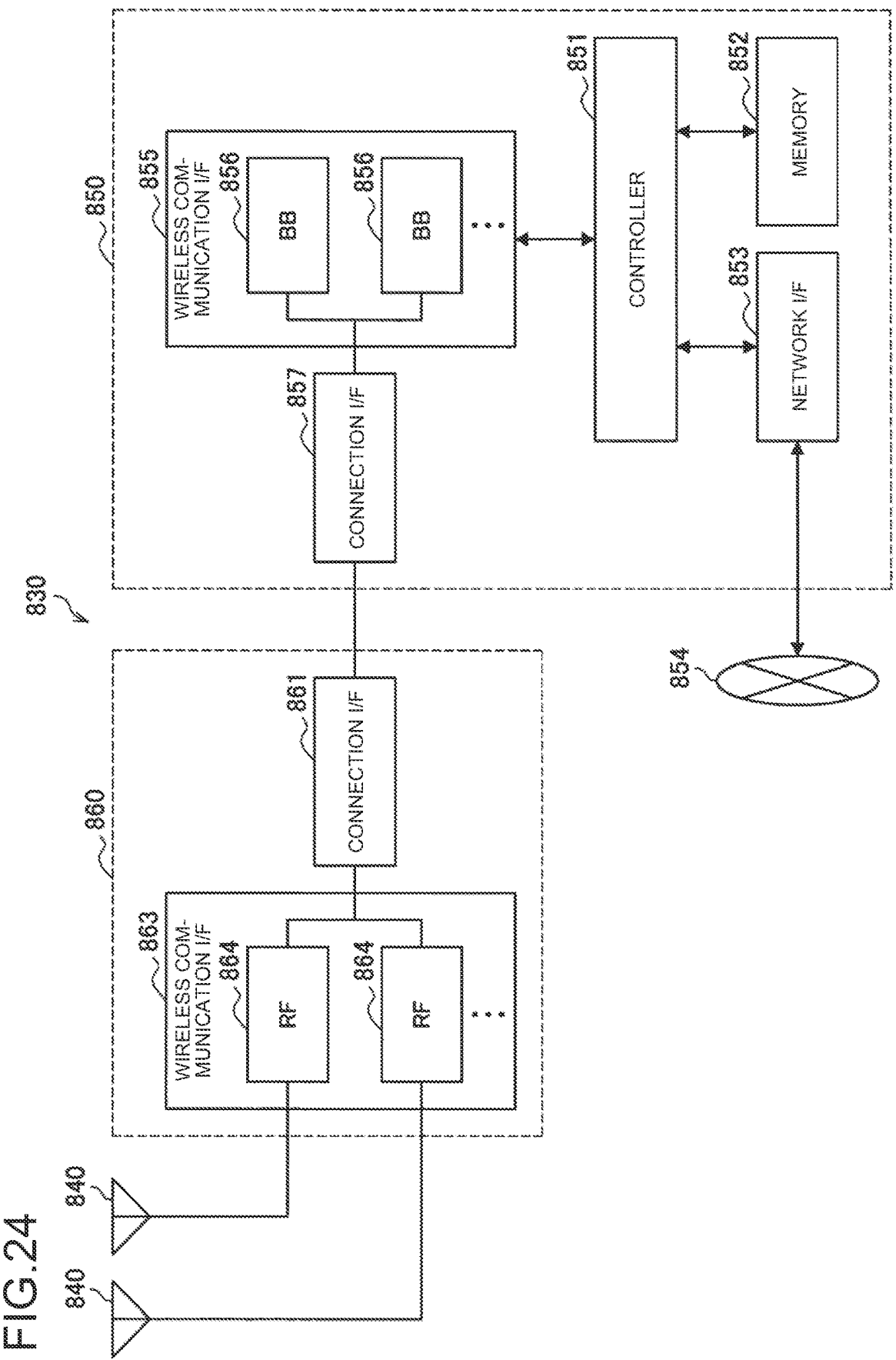
FIG. 24 is a block diagram illustrating a second example of the schematic configuration of the eNB.

FIG. 24 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 24, and the plurality of antennas 840 may, for example, correspond to a plurality of frequency bands used by the eNB 830. Note that FIG. 24 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 23.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 23 except that the BB processor 856 is connected to an RF circuit 864 of the RRH 860 via the connection interface 857. The wireless communication interface 855 may include a plurality of the BB processors 856, as illustrated in FIG. 24, and the plurality of BB processors 856 may, for example, correspond to a plurality of frequency bands used by the eNB 830. Note that FIG. 24 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 24, and the plurality of RF circuits 864 may, for example, correspond to a plurality of antenna elements. Note that FIG. 24 illustrates an example in which the wireless communication interface 863 includes the plurality of RF circuits 864, but the wireless communication interface 863 may include the single RF circuit 864.

In the eNB 830 illustrated in FIG. 24, the setting unit 41 and/or the message transceiving unit 43 described with reference to FIG. 17 may be implemented by the wireless communication interface 855, the wireless communication interface 863 (such as the BB processor 856 and/or the RF circuit 864), the controller 851 and/or the network interface 853. For example, the wireless communication interface 855, the wireless communication interface 863, the controller 851 and/or the network interface 853 acquire setting information from the satellite station device 10 and transmit channels/signals to the satellite station device 10 using transmission parameters in accordance with the setting information. For example, a processor included in the wireless communication interface 855 and/or the wireless communication interface 863 may implement the functions for performing such operation. The eNB 830, the base station device 850, or the module may be provided as a device that performs such operation. In addition, it is possible to provide a program that causes a processor to perform the above-described operation. In addition, it is possible to provide a readable recording medium having the above-described program recorded thereon.

<6.2. Application Examples for Terminal Device>

First Application Example

Figure 25:
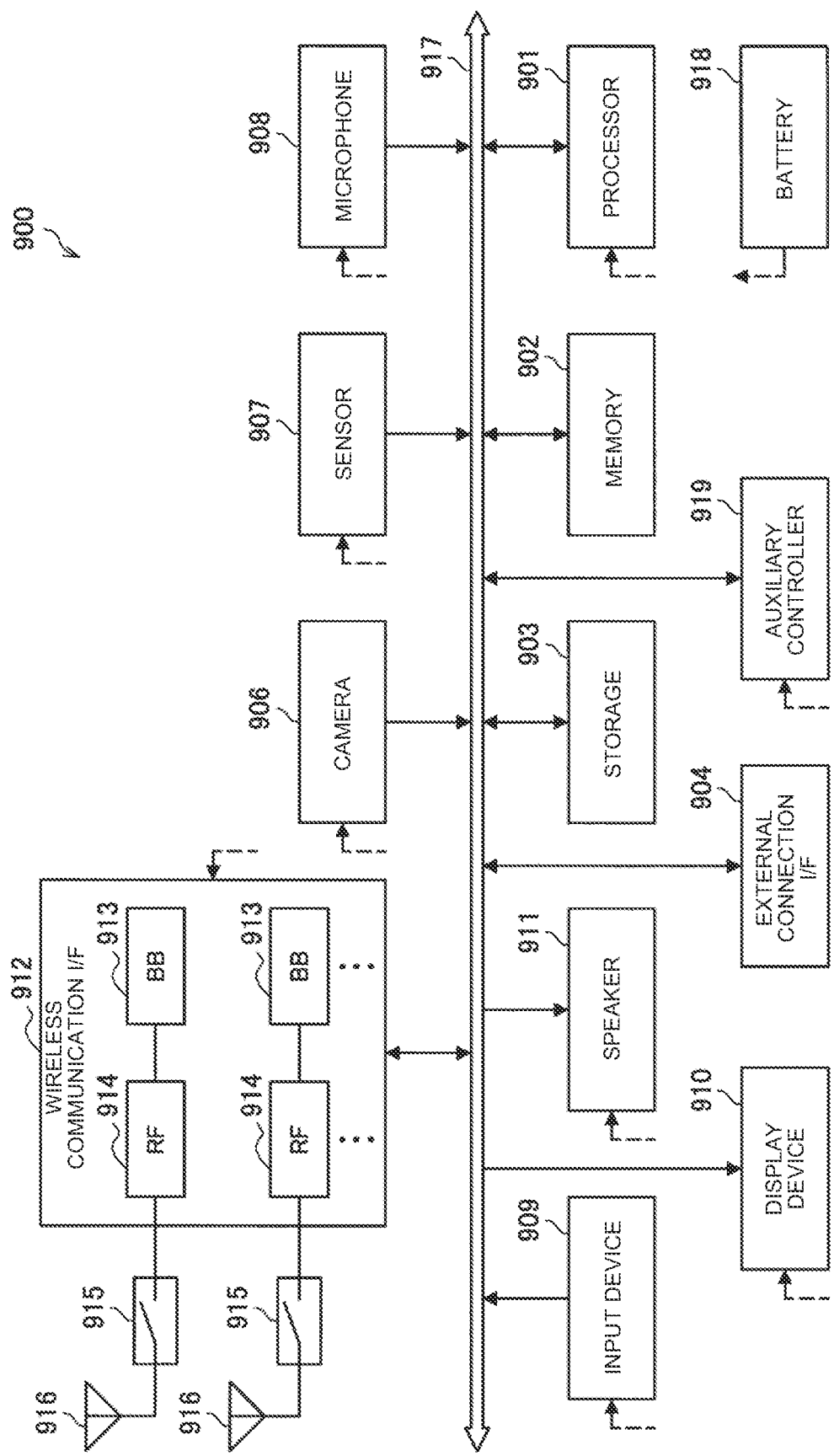
FIG. 25 is a block diagram illustrating an example of a schematic configuration of a smartphone.

FIG. 25 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 25. Note that FIG. 25 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 25. Note that FIG. 25 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 25 via a feeder line that is partially illustrated in the figure as a dashed line. The auxiliary controller 919, for example, operates a minimally necessary function of the smartphone 900 in a sleep mode.

In the smartphone 900 illustrated in FIG. 25, the setting unit 41 and/or the message transceiving unit 43 described with reference to FIG. 17 may be implemented by the wireless communication interface 912 (such as the BB processor 913 and/or the RF circuit 914), the processor 901 and/or the auxiliary controller 919. For example, the wireless communication interface 912, the processor 901, and/or the auxiliary controller 919 acquire setting information from the satellite station device 10 and transmit channels/signals to the satellite station device 10 using transmission parameters in accordance with the setting information. For example, a processor included in the wireless communication interface 912 may implement the functions for performing such operation. The smartphone 900 or the module described above may be provided as a device that performs such operation. In addition, it is possible to provide a program that causes a processor to perform the above-described operation. In addition, it is possible to provide a readable recording medium having the above-described program recorded thereon.

Second Application Example

FIG. 26 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 26. Note that FIG. 26 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 26. Note that FIG. 26 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 26 via a feeder line that is partially illustrated in the figure as a dashed line. Further, the battery 938 accumulates the electric power supplied from the vehicle.

In the car navigation apparatus 920 illustrated in FIG. 26, the setting unit 41 and/or the message transceiving unit 43 described with reference to FIG. 17 may be implemented by the wireless communication interface 933 (such as the BB processor 934 and/or the RF circuit 935), and/or the processor 921. For example, the wireless communication interface 933 and/or the processor 921 acquires setting information from the satellite station device 10 and transmits channels/signals to the satellite station device 10 using transmission parameters in accordance with the setting information. For example, a processor included in the wireless communication interface 933 may implement the functions for performing such operation. The car navigation apparatus 920 or the module described above may be provided as a device that performs such operation. In addition, it is possible to provide a program that causes a processor to perform the above-described operation. In addition, it is possible to provide a readable recording medium having the above-described program recorded thereon.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

7. CONCLUSION

An embodiment of the present disclosure has been described above with reference to FIG. 1 to FIG. 26. As described above, the earth terminal device 40 according to the present embodiment acquires information regarding the type of the satellite station device 10 and controls a transmission timing of a signal to the satellite station device 10 on the basis of the information regarding the type of the satellite station device 10. The earth terminal device 40 can compensate for the propagation delay due to the altitude of the satellite station device 10 by controlling a transmission timing on the basis of the type of the satellite station device 10, particularly, on the basis of the altitude. For example, the earth terminal device 40 can achieve synchronization relating to transmission of a signal from the earth terminal device 40 to the satellite station device 10 by controlling the timing advance value. Further, the earth terminal device 40 can achieve symbol synchronization by sufficiently removing inter-symbol interference and inter-subcarrier interference relating to transmission of a signal from the terminal device 40 to the satellite station device 10 by controlling the CP length. In this manner, because synchronization relating to transmission of a signal from the earth terminal device 40 to the satellite station device 10 can be achieved, it is possible to improve wireless link quality regarding transmission from the earth terminal device 40 to the satellite station device 10.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above-described embodiment, the satellite station device 10 generates the satellite station device related information, the present technology is not limited to such an example. For example, the satellite station device related information may be generated by other devices (such as, for example, control entity and the VSAT 30 within the core network 21).

In the processes described with reference to the flowcharts and the sequence diagrams in the present specification may not necessarily be performed in the sequences illustrated in the drawings. Several processing steps may be performed in parallel. In addition, additional processing steps may be adopted or some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification. Additionally, the present disclosure may also be configured as below.

(1)
A terminal device comprising:
a control unit configured to acquire information regarding a type of a base station device and control a transmission timing of a signal to the base station device on a basis of the information regarding the type of the base station device.

(2)
The terminal device according to (1), wherein the information regarding the type of the base station device includes information regarding altitude of the base station device.

(3)
The terminal device according to (1) or (2), wherein the control unit calculates a timing advance value by adding a second value based on a position of the terminal device in a cell provided by the base station device to a first value based on the type of the base station device.

(4)
The terminal device according to (3), wherein the control unit transmits a physical random access channel (PRACH) to the base station device at a transmission timing based on the first value and acquires the second value from the base station device.

(5)
The terminal device according to (3) or (4), wherein a maximum value of a range of the second value corresponds to a distance obtained by subtracting altitude of the base station device from a distance between the base station device and an edge of the cell provided by the base station device.

(6)
The terminal device according to (1) or (2), wherein the control unit switches a range of a timing advance value in accordance with a maximum propagation delay in accordance with altitude of the base station device.

(7)
The terminal device according to (6), wherein the range of the timing advance value is switched by switching of a maximum value of the timing advance value.

(8)
The terminal device according to (6), wherein the range of the timing advance value is switched by switching of an adjusted particle size of the timing advance value.

(9)
The terminal device according to (6), wherein the control unit switches the range of the timing advance value in accordance with a minimum propagation delay in accordance with the altitude of the base station device.

(10)
The terminal device according to any one of (1) to (5), wherein the control unit replaces the range of the timing advance value with a range in accordance with altitude of the base station device.

(11)
The terminal device according to any one of (1) to (10), wherein the control unit uses a predetermined value in accordance with altitude of the base station device as a timing advance value.

(12)
The terminal device according to any one of (1) to (11), wherein the control unit controls a cyclic prefix (CP) length in accordance with the type of the base station device.

(13)
The terminal device according to any one of (1) to (12), wherein a notification of the information regarding the type of the base station device is made using system information.

(14)
A base station device which performs communication with a terminal device,
the base station device comprising:
a control unit configured to transmit information regarding a type of the base station device to the terminal device.

(15)
The base station device according to (14), wherein the control unit calculates a second value based on a position of the terminal device in a cell provided by the base station device, for calculating a timing advance value to be used by the terminal device, on a basis of a reception timing of a PRACH from the terminal device, and transmits the second value to the terminal device.

(16)
A method to be executed by a processor, the method comprising:
acquiring information regarding a type of a base station device and controlling a transmission timing of a signal to the base station device on a basis of the information regarding the type of the base station device.

(17)
A method to be executed by a base station device which performs communication with a terminal device,
the method including
transmitting information regarding a type of the base station device to the terminal device.

(18)
A recording medium having a program recorded therein, the program causing a computer to function as
a control unit configured to acquire information regarding a type of a base station device and control a transmission timing of a signal to the base station device on the basis of the information regarding the type of the base station device.

(19) A recording medium having a program recorded therein, the program causing a computer to function as
a control unit configured to transmit information regarding a type of a base station device which performs communication with a terminal device, to the terminal device.

REFERENCE SIGNS LIST

10 SATELLITE STATION DEVICE
11 SETTING UNIT
13 MESSAGE TRANSCEIVING UNIT
20 AIRCRAFT STATION DEVICE
30 EARTH STATION
31 CORE NETWORK
32 INTERNET
33 TERRESTRIAL NETWORK
40 EARTH TERMINAL DEVICE
41 SETTING UNIT
43 MESSAGE TRANSCEIVING UNIT
100 BASE STATION DEVICE
101 HIGHER LAYER PROCESSING UNIT
103 CONTROL UNIT
105 RECEIVING UNIT
1051 DECODING UNIT
1053 DEMODULATING UNIT
1055 DEMULTIPLEXING UNIT
1057 WIRELESS RECEIVING UNIT
1059 CHANNEL MEASURING UNIT
107 TRANSMITTING UNIT
1071 ENCODING UNIT
1073 MODULATING UNIT
1075 MULTIPLEXING UNIT
1077 WIRELESS TRANSMITTING UNIT
1079 DOWNLINK REFERENCE SIGNAL GENERATING UNIT
109 TRANSCEIVING ANTENNA
200 TERMINAL DEVICE
201 HIGHER LAYER PROCESSING UNIT
203 CONTROL UNIT
205 RECEIVING UNIT
2051 DECODING UNIT
2053 DEMODULATING UNIT
2055 DEMULTIPLEXING UNIT
2057 WIRELESS RECEIVING UNIT
2059 CHANNEL MEASURING UNIT
207 TRANSMITTING UNIT
2071 ENCODING UNIT
2073 MODULATING UNIT
2075 MULTIPLEXING UNIT
2077 WIRELESS TRANSMITTING UNIT
2079 UPLINK REFERENCE SIGNAL GENERATING UNIT

What is claimed is:

1. A terminal device, comprising:
a radio transceiver; and
circuitry configured to:
control the radio transceiver to receive System Information Block (SIB) that is broadcast from a base station device, and a Random Access Response (RAR) transmitted from the base station device, the RAR corresponds to a Random Access preamble which is transmitted from the terminal device to the base station device;
determine whether or not the SIB contains satellite station related information;
on condition that the SIB doesn't contain the satellite station related information, calculate a timing advance value for controlling an uplink transmission timing based on a second value, wherein a first value is not used to calculate the timing advance; and
on condition that the SIB contains the satellite station related information, calculate the timing advance value based on addition of the first value to the second value, wherein
the first value is TA_satellite which is computed based on the satellite station related information contained in the SIB and the second value is TA_normal which is contained in the received RAR.

2. The terminal device according to claim 1, wherein the satellite station related information is information for the satellite station, wherein the satellite station is one of same as the base station device or different from the base station device.

3. The terminal device according to claim 1, wherein the satellite station related information includes at least one of:
information of an orbital parameter for the satellite station, or
information indicating a velocity of the satellite station.

4. The terminal device according to claim 3, wherein the information of the orbital parameter for the satellite station includes information indicating an inclination of the satellite station.

5. The terminal device according to claim 1, wherein the second value is based on a position of the terminal device in a cell provided by the base station device.

6. A base station device which performs communication with a terminal device, the base station device comprising:
a radio transceiver; and
circuitry configured to control the radio transceiver to:
broadcast System Information Block (SIB), and
transmit a Random Access Response (RAR) corresponding to a Random Access preamble which is transmitted from the terminal device to the base station device, wherein
on condition that the SIB doesn't contain satellite station related information, a timing advance value for controlling an uplink transmission timing from the terminal device is calculated by the terminal device based on a second value, wherein a first value is not used to calculate the timing advance,
on condition that the SIB contains the satellite station related information, the timing advance value is calculated by the terminal device based on addition of the first value to the second value, and
the first value is TA_satellite which is computed based on the satellite station related information contained in the SIB and the second value is TA_normal which is contained in the transmitted RAR.

7. The base station device according to claim 6, wherein the satellite station related information is information for the satellite station, wherein the satellite station is one of same as the base station device or different from the base station device.

8. The base station device according to claim 6, wherein the satellite station related information includes at least one of:
information of an orbital parameter for the satellite station, or
information indicating a velocity of the satellite station.

9. The base station device according to claim 8, wherein the information of the orbital parameter for the satellite station includes information indicating an inclination of the satellite station.

10. The base station device according to claim 6, wherein the second value is based on a position of the terminal device in a cell provided by the base station device.

11. A method of a terminal device, the method comprising:
- receiving System Information Block (SIB) that is broadcast from a base station device, and a Random Access Response (RAR) transmitted from the base station device, the RAR corresponds to a Random Access preamble which is transmitted from the terminal device to the base station device;
- determining whether or not the SIB contains satellite station related information;
- on condition that the SIB doesn't contain the satellite station related information, calculating a timing advance value for controlling an uplink transmission timing based on a second value, wherein a first value is not used to calculate the timing advance; and
- on condition that the SIB contains the satellite station related information, calculating the timing advance value based on addition of the first value to the second value, wherein the first value is TA_satellite which is computed based on the satellite station related information contained in the SIB and the second value is TA_normal which is contained in the received RAR.

12. A method of a base station device that performs communication with a terminal device, the method comprising:
- broadcasting System Information Block (SIB); and
- transmitting a Random Access Response (RAR) corresponding to a Random Access preamble which is transmitted from the terminal device to the base station device, wherein
  - on condition that the SIB doesn't contain satellite station related information, a timing advance value for controlling an uplink transmission timing from the terminal device is calculated by the terminal device based on a second value, wherein a first value is not used to calculate the timing advance,
  - on condition that the SIB contains the satellite station related information, the timing advance value is calculated by the terminal device based on addition of the first value to the second value, and
  - the first value is TA_satellite which is computed based on the satellite station related information contained in the SIB and the second value is TA_normal which is contained in the transmitted RAR.

* * * * *